US011933287B2

(12) United States Patent
Bumby et al.

(10) Patent No.: US 11,933,287 B2
(45) Date of Patent: Mar. 19, 2024

(54) PUMP FOR A MICROFLUIDIC DEVICE

(71) Applicant: TTP Ventus Ltd., Melbourn (GB)

(72) Inventors: James Samuel Bumby, Melbourn (GB); Stuart Andrew Hatfield, Cambridge (GB)

(73) Assignee: TTP VENTUS LTD., Melbourn (GB)

( * ) Notice: Subject to any disclaimer, the term of this patent is extended or adjusted under 35 U.S.C. 154(b) by 97 days.

(21) Appl. No.: 17/394,485

(22) Filed: Aug. 5, 2021

(65) Prior Publication Data

US 2022/0042505 A1 Feb. 10, 2022

(30) Foreign Application Priority Data

Aug. 10, 2020 (GB) ...................................... 2012420

(51) Int. Cl.
*F04B 43/04* (2006.01)
*B01L 3/00* (2006.01)
(Continued)

(52) U.S. Cl.
CPC ........ *F04B 43/046* (2013.01); *B01L 3/50273* (2013.01); *F04B 45/047* (2013.01); *F04B 53/1037* (2013.01); *B01L 2400/0478* (2013.01)

(58) Field of Classification Search
CPC .. F04B 43/046; F04B 45/047; F04B 53/1037; B01L 3/50273; B01L 2400/0478
See application file for complete search history.

(56) References Cited

U.S. PATENT DOCUMENTS 1,970,473 A * 8/1934 Parker .................... A47K 10/10 16/DIG. 24
6,309,194 B1 10/2001 Fraser et al.
(Continued)

FOREIGN PATENT DOCUMENTS

CH 597544 A5 4/1978
CN 2549207 Y 5/2003
(Continued)

OTHER PUBLICATIONS

International Search Report and Written Opinion for International Application No. PCT/GB2019/052789, dated Jan. 3, 2020.
(Continued)

*Primary Examiner* — Connor J Tremarche
(74) *Attorney, Agent, or Firm* — CANTOR COLBURN LLP

(57) ABSTRACT

A pump for a microfluidic device is disclosed. The pump comprises an actuator and a resilient isolator which is a planar, layered structure. The resilient isolator may comprise a support layer and optionally other layers for strengthening against tensile stress imposed by bending. Alternatively or in addition, the resilient isolator may comprise a plurality of annular regions, layers of the resilient isolator being configured such that at least one of the plurality of annular regions is less resistant than another one of the plurality of annular regions to bending. The actuator may comprise a piezoelectric disc including a surface which comprises electrode regions for electrical connection with respective conductive regions of a conductive layer of the resilient isolator, and an alignment feature for rotational alignment of the piezoelectric disc to ensure the electrical connection between the electrode regions and the respective conductive regions.

33 Claims, 28 Drawing Sheets

(51) Int. Cl.
*F04B 45/047* (2006.01)
*F04B 53/10* (2006.01)

(56) References Cited

U.S. PATENT DOCUMENTS

| | | | | |
|---|---|---|---|---|
| 10,598,192 | B2 | 3/2020 | Bukland et al. | |
| 2004/0120836 | A1 | 6/2004 | Dai et al. | |
| 2007/0138914 | A1* | 6/2007 | Ishikawa | H10N 30/875 310/328 |
| 2007/0242427 | A1 | 10/2007 | Yamamoto et al. | |
| 2009/0015097 | A1 | 1/2009 | Meng et al. | |
| 2010/0002051 | A1* | 1/2010 | Yoshimura | B41J 2/15 347/40 |
| 2010/0290935 | A1 | 11/2010 | Richter et al. | |
| 2015/0023821 | A1* | 1/2015 | Campbell | F04B 43/046 417/413.1 |
| 2017/0002839 | A1* | 1/2017 | Bukland | F04B 45/047 |
| 2020/0332790 | A1 | 10/2020 | Tanaka | |
| 2020/0371536 | A1 | 11/2020 | Tanaka et al. | |

FOREIGN PATENT DOCUMENTS

| | | | | |
|---|---|---|---|---|
| CN | 1455107 | A | 11/2003 | |
| CN | 102638166 | A | 8/2012 | |
| CN | 106787898 | A | 5/2017 | |
| EP | 042087 | A1 | 4/1991 | |
| GB | 2576796 | A | 3/2020 | |
| GB | 2577710 | A | 4/2020 | |
| GB | 2583880 | A | * 11/2020 | F04B 43/046 |
| JP | S57171460 | U | 10/1982 | |
| JP | 2008002387 | A | 1/2008 | |
| JP | 2009079482 | A | 4/2009 | |
| JP | 2014238012 | A | 12/2014 | |
| WO | WO2006/111775 | | 10/2006 | |
| WO | WO2009/152775 | | 12/2009 | |
| WO | WO2010/139917 | | 12/2010 | |
| WO | WO2010/139918 | | 12/2010 | |
| WO | WO2012/061044 | | 5/2012 | |
| WO | WO2013/117945 | | 8/2013 | |
| WO | WO2013/134056 | | 9/2013 | |
| WO | WO2015/173280 | | 11/2015 | |
| WO | WO2018/049060 | | 3/2018 | |
| WO | WO2020/070498 | | 4/2020 | |
| WO | WO2020/115502 | | 6/2020 | |
| WO | WO2020/128426 | | 6/2020 | |

OTHER PUBLICATIONS

Search Report for GB Application No. GB1816156.2, dated Mar. 29, 2019.

International Search Report and Written Opinion for International Application No. PCT/GB2019/053458, dated Feb. 19, 2020.

Combined Search and Examination Report for GB Application No. GB1820025.3, dated May 14, 2019.

International Search Report and Written Opinion for International Application No. PCT/GB2019/053459, dated Feb. 19, 2020.

Combined Search and Examination Report for GB Application No. GB1900952.1, dated Mar. 27, 2019.

Examination Report for GB Application No. GB1900952.1, dated Nov. 12, 2020.

Combined Search and Examination Report for GB Application No. GB2012420.2, dated Jan. 6, 2021.

* cited by examiner

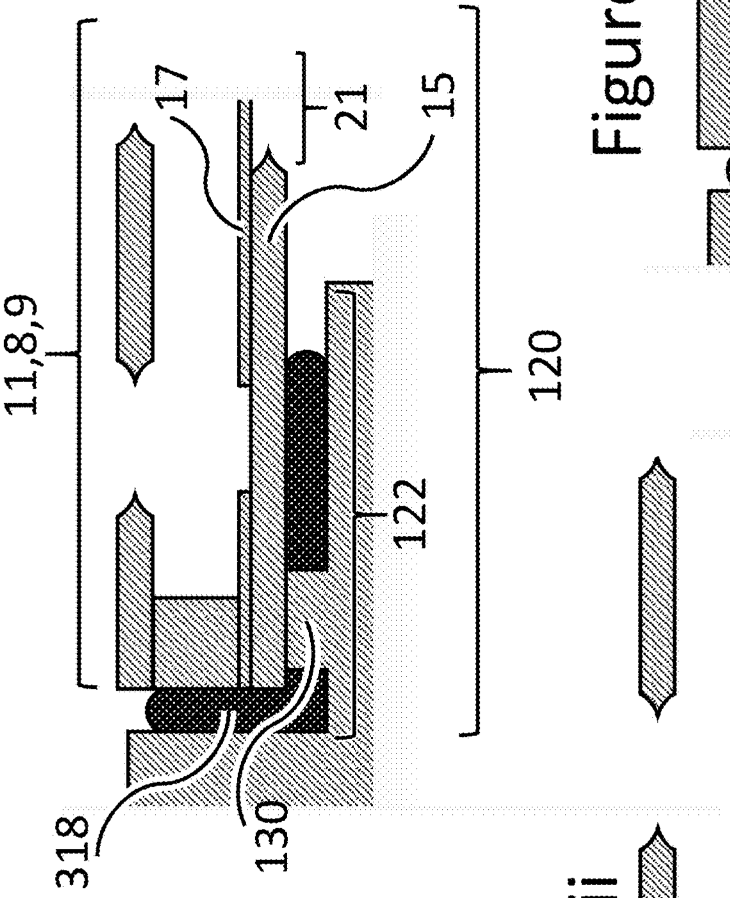
Figure 7 i
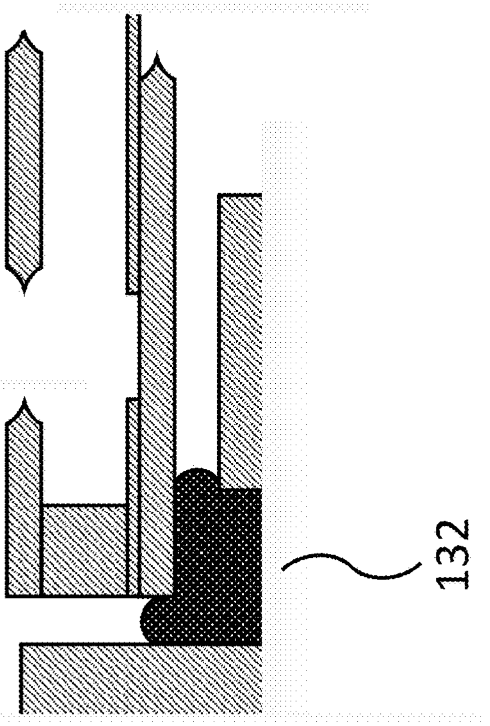
Figure 7 ii
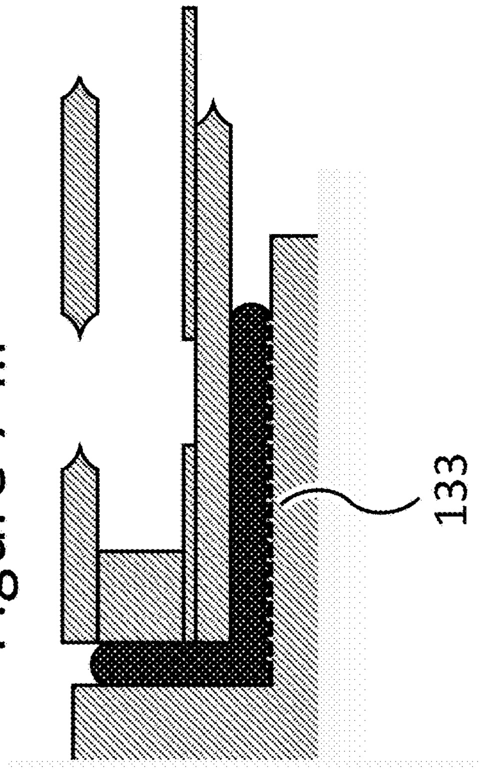
Figure 7 iii

PUMP FOR A MICROFLUIDIC DEVICE

CROSS-REFERENCE TO RELATED APPLICATIONS

This application claims priority to GB Application No. 2012420.2, entitled "Pump for a Microfluidic Device," filed Aug. 10, 2020, which is incorporated herein by reference in its entirety.

BACKGROUND

The Many microfluidic devices, including diagnostic and fluid control systems, include pumps that can precisely and rapidly reach a target positive or vacuum pressure. It is advantageous for such pumps to be responsive, allowing for the fine control of reagents, whilst also being pulsation free when maintaining a set pressure. Furthermore, as microfluidic technology becomes more prevalent it is advantageous for pumps to be both compact and silent, enabling the miniaturization and transportation of sophisticated diagnostic devices.

A pump that operates at very high frequency fulfils accomplishes these characteristics. The time scale for both the responsiveness and the pulsatility are set by the operation cycle of the device. Similarly, a pump operating at ultrasonic frequencies will be both inaudible and have a spatially compact fundamental acoustic mode. In practice, operation above 20 kHz is sufficient to meet all the above demands. One such high frequency pump, having a substantially disc-shaped cavity with a high aspect ratio, i.e., the ratio of the radius of the cavity to the height of the cavity, is disclosed in international patent WO2006111775, the entire contents of which are herein incorporated by reference.

Some valve(s) in the pump are responsive to a high frequency oscillating pressure that is rectified to create a net flow of fluid through the pump. One such valve design that is suitable for operating at frequencies of 20 kHz and higher is described in international patent publication WO2010139917, the entire contents of which are also herein incorporated by reference.

For a pump to be used in a microfluidic device, it generates high pressures, with flow of secondary importance. The dimensions of the microfluidic channels, in conjunction with the viscosity of the driven fluid, specify the pressure suitable for successful operation. For many pressure-driven-flow applications, pressures in excess of 1 bar are achieved, whilst the flow requirement is typically of the order of tens to hundreds of cubic centimetres per minute.

One arrangement of WO2006111775 uses a single valve per cavity to perform half-wave pressure rectification. The valves are placed at the pressure antinodes to maximise the pressure gradient across them. Manifolding with low flow resistance, placed close to the nodal position of the pressure wave in each cavity, links two such cavities together in series. In this configuration, one cavity provides the inlet stroke and a different cavity provides the outlet stroke for the pumping mechanism. In the ideal case where the manifolding has zero flow resistance, no static pressure difference can exist between the two cavities. Each valved aperture within the pump produces a DC pressure increase of $\Delta P \approx 0.25$ "mBar", such that the total pressure output of this implementation is $2\Delta P$.

A second arrangement of WO2006111775 uses two valves per cavity to perform full-wave pressure rectification. Both valves are placed at antinodes of the pressure wave but are oriented such that the rectification directions of the valves are opposite one another. One valve is connected to the cavity inlet, whilst the second is connected to the cavity outlet. The valves may be combined side-by-side into a composite structure, be separate but within the same local antinode, or may be located distant to each other in separate antinodes. When two or more valves are combined side-by-side into a composite structure, the total structure comprising both valving regions and joining regions, along with additional features, may be referred to as a split valve (SV).

In this second arrangement, the inlet and outlet strokes occur within the same cavity; analogously to the first arrangement of WO2006111775 discussed above, the output of one such cavity may be fed into the inlet of a second such cavity in series via low-flow-resistance manifolding providing a total pressure output of $4\Delta P$. With both the inlet and the outlet of each cavity rectified, a static pressure difference between the two cavities can arise. This undesirable effect can lead to fatigue of the actuator and fatigue of the isolator. The present disclosure aims to address these problems, at least to some extent.

SUMMARY

In accordance with some embodiments, a pump for a microfluidic device is provided. The pump comprises a pump body comprising an end wall connected to a peripheral side wall; an actuator located opposite the end wall and connected to the side wall by a resilient isolator so as to define a substantially cylindrical cavity for containing a fluid, the actuator being configured to oscillate in an axial direction so as to produce a spatially varying pressure wave in the cavity; and first and second valves arranged to control flow of the fluid in the cavity and each located at a pressure antinode of the pressure wave, wherein: the resilient isolator is a planar, layered structure comprising a conductive layer and a support layer and is susceptible to out-of-plane bending under the oscillation of the actuator in the axial direction; and a first surface of the conductive layer is arranged on the support layer so as to strengthen a portion of the first surface against tensile stress imposed on the first surface by said bending.

To a first approximation, the neutral plane of the resilient isolator is in the middle of the conductive layer. Because the neutral plane is effectively within the conductive layer, during bending one surface of the conductive layer experiences compressive stress while another surface of the conductive layer experiences tensile stress. For pneumatic failure of the isolator to occur, a crack must propagate through the full thickness of the resilient isolator. This process occurs far more readily at sites where the isolator material is in tension than in compression, as in compressed regions of the isolator any cracks are biased closed and no new material is exposed to the crack tip. Therefore, it is desirable to reinforce any portion of the surface of the resilient isolator which experiences tensile stress. In this way isolator and actuator fatigue may be reduced.

Said portion of the first surface may be located at an interface region between the resilient isolator and the actuator.

The conductive layer may comprise a second surface which is opposite the first surface thereof, the second surface being exposed to the substantially cylindrical cavity.

The conductive layer may comprise a second surface which is opposite the first surface thereof and a reinforcement layer is arranged on the second surface so as to strengthen a portion of the second surface against tensile stress imposed on the second surface by said bending.

Said portion of the second surface may be located at an interface region between the resilient isolator and the peripheral side wall.

The resilient isolator may comprise a protective layer disposed on the second surface of the conductive layer between the reinforcement layer and the actuator.

The reinforcement layer and the protective layer may together substantially fully cover the second surface of the conductive layer.

In accordance with some embodiments, a pump for a microfluidic device is provided. The pump comprises: a pump body comprising an end wall connected to a peripheral side wall; an actuator located opposite the end wall and connected to the side wall by a resilient isolator so as to define a substantially cylindrical cavity for containing a fluid, the actuator being configured to oscillate in an axial direction so as to produce a spatially varying pressure wave in the cavity; and first and second valves arranged to control flow of the fluid in the cavity and each located at a pressure antinode of the pressure wave, wherein the resilient isolator is a planar, layered structure comprising a plurality of annular regions between the side wall and the actuator, layers of the resilient isolator being configured such that at least one of the plurality of annular regions is less resistant than another one of the plurality of annular regions to out-of-plane bending under the oscillation of the actuator in the axial direction.

The annular regions of different stiffness advantageously reduce isolator and actuator fatigue while providing for effective actuator performance.

In accordance with some embodiments, the following features can additionally or alternatively apply to the above discussed embodiments.

The resilient isolator may comprise an outer said annular region connected to the side wall and an inner said annular region connected to the actuator, the layers of the resilient isolator being configured such that one of the outer annular region and the inner annular region is less resistant than the other of the outer annular region and the inner annular region to said out-of-plane bending under the oscillation of the actuator in the axial direction.

The layers of the resilient isolator may be configured such that the inner annular region is less resistant than the outer annular region to said out-of-plane bending under the oscillation of the actuator in the axial direction.

The layers of the resilient isolator may be configured such that the outer annular region is less resistant than the inner annular region to said out-of-plane bending under the oscillation of the actuator in the axial direction.

The resilient isolator may comprise an outer said annular region connected to the side wall, an inner said annular region connected to the actuator, and an intermediate said annular region between the inner and outer annular regions, the layers of the resilient isolator being configured such that the intermediate annular region is less resistant than the inner and outer annular regions to said out-of-plane bending under the oscillation of the actuator in the axial direction.

The layers of the resilient isolator may be configured such that the inner annular region and the outer annular region have substantially the same resistance to said out-of-plane bending under the oscillation of the actuator in the axial direction.

The layers of the resilient isolator may be configured such that the inner annular region is less resistant than the outer annular region to said out-of-plane bending under the oscillation of the actuator in the axial direction.

The layers of the resilient isolator may be configured such that the outer annular region is less resistant than the inner annular region to said out-of-plane bending under the oscillation of the actuator in the axial direction.

The resilient isolator may comprise an electrical isolation layer located between first and second electrical conduction layers.

The resilient isolator may comprise a protective layer located on the first electrical conduction layer.

The resilient isolator may comprise a fluid barrier layer configured to prevent the fluid from escaping from the cavity.

One or both of an annular region of the resilient isolator, which is less resistant to said out-of-plane bending, and another annular region, which is more resistant to said out-of-plane bending, may comprise the fluid barrier layer.

A first annular region of the resilient isolator, which is less resistant than a second annular region to said out-of-plane bending, may comprise a patterned layer, such that at least a portion of the first annular region has a thickness in the axial direction which is less than the thickness of the second annular region in the axial direction.

The patterned layer may comprise a pattern including circular sections.

The patterned layer may comprise a pattern including arcs.

The patterned layer may comprise a pattern including regular or irregular polygons.

The patterned layer may comprise a pattern including diamonds, squares or other rectangles.

The regular or irregular polygons, diamonds, squares or other rectangles, may include rounded corners.

The pattern may be regular or repeated with respect to one or more of the radial direction, the azimuthal direction, and the axial direction.

The pattern may comprise through-holes provided in the patterned layer.

The patterned layer may be formed by removal of material from the first annular region of the resilient isolator.

At least two of the layers of the resilient isolator may be joined together by an adhesive.

An annular region of the resilient isolator, which is less resistant to said out-of-plane bending, may have a greater radial width than another annular region, which is more resistant to said out-of-plane bending.

The pump body may comprise a second end wall connected to the peripheral side wall and located opposite the actuator so as to define a second substantially cylindrical cavity for containing a fluid, the first and second substantially cylindrical cavities being separated from each other by the actuator, the actuator being further configured to oscillate in the axial direction so as to produce a second spatially varying pressure wave in the second cavity which is approximately 180 degrees out of phase with the first spatially varying pressure wave, the pump further comprising third and fourth valves arranged to control flow of the fluid in the second cavity and each located at a pressure antinode of the second pressure wave.

In accordance with some embodiments, an actuator for a pump is provided. The actuator comprises a piezoelectric disc including a surface which comprises: a first electrode region for electrical connection with a first conductive region of the conductive layer of the resilient isolator; and a second electrode region for electrical connection with a second conductive region of the conductive layer of the resilient isolator, wherein: the first and second electrode regions are distinct from each other and the first and second conductive regions are distinct from each other, such as to provide electrical continuity between the first electrode and the first conductive region and between the second electrode and the second conductive region while providing electrical isolation between the first electrode and the second conductive region and between the second electrode and the first conductive region; and the piezoelectric disc comprises an alignment feature for rotational alignment of the piezoelectric disc to ensure the electrical connection between the first electrode region and the first conductive region and between the second electrode region and the second conductive region.

The alignment feature may comprise a straight edge of the piezoelectric disc for locating engagement with a complementary edge of the resilient isolator or the pump body.

BRIEF DESCRIPTION OF THE DRAWINGS

Embodiments will now be described, by way of example, with reference to the accompanying figures in which:

FIGS. 7*i*, 7*ii*, and 7*iii* show three examples of valve recesses;

DETAILED DESCRIPTION

The present disclosure includes a fluid pump assembly, in particular a pump assembly comprising two body parts arranged around a central actuator. The pump contains valves for controlling fluid flow, with each valve having a flap that is disposed between two plates and capable of movement between an open and closed position. More specifically, we disclose a pump containing valves or arrays of valves which are capable of utilising both the positive and negative pressure components of a driving pressure field, the realisation of which allows the pump to generate pressures of the order of 1 bar.

For a valve to perform rectification of an acoustic wave, the valve can take as an input a pressure oscillation containing, in principle, positive and negative gauge pressures, and allow a mean flow only in one direction. This flow can be into the pump via an inlet, or from the pump via an outlet, or both into the pump via an inlet and from the pump via a separate outlet. A valve or arrangement of valves that only allows flow into or out of the pump is described herein as being half-wave rectifying, as it only transmits flow during one half of the pressure cycle. A valve or arrangement of valves that allows flow into the pump through an inlet during half of the pressure cycle, then from the pump through the outlet during the other half of the pressure cycle, is described herein as being full-wave rectifying, as one or more elements of the valve or arrangement of valves are active during both halves of the pressure cycle.

Full-wave pressure rectification pumps will now be discussed in general.

Figure 1:
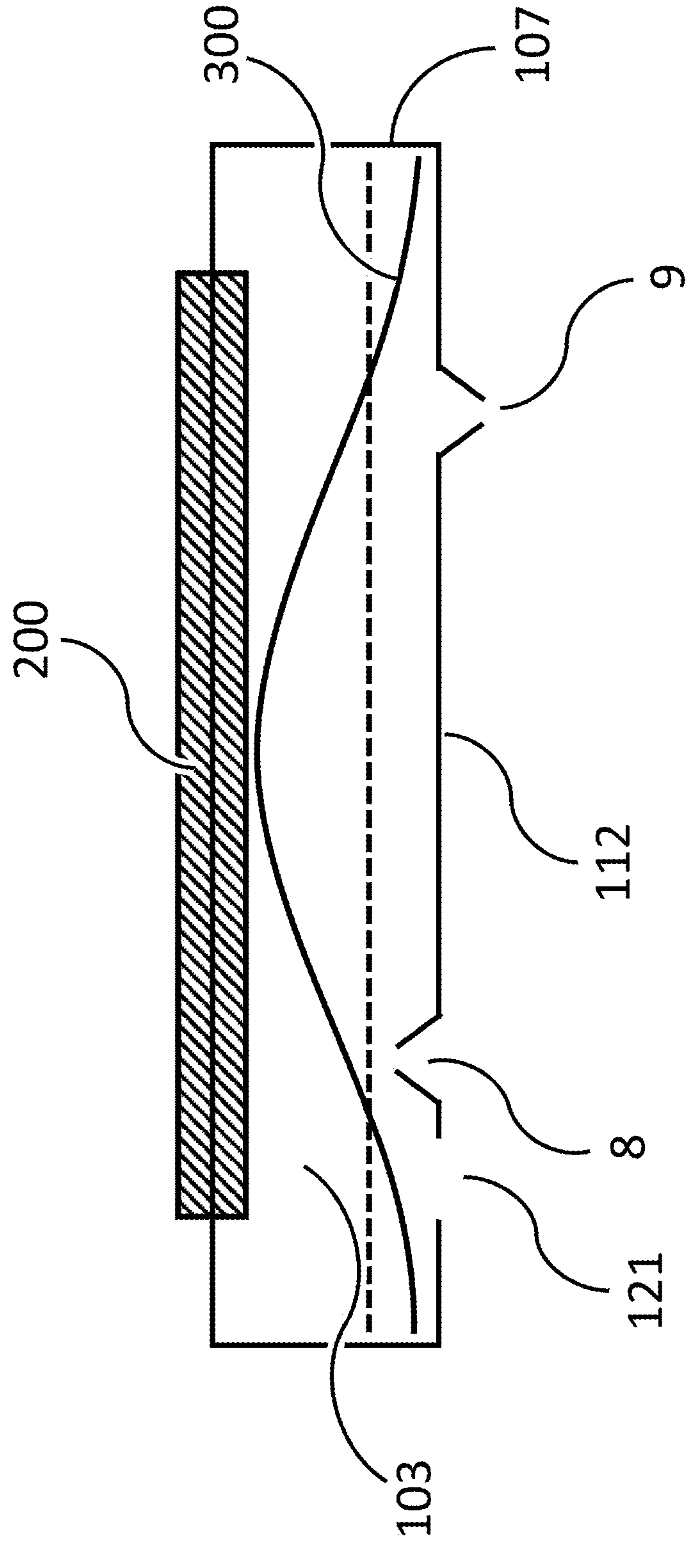
FIG. 1 shows a sketch of a general single-cavity pump.

FIG. 1 shows a simplified sketch of an acoustic micropump. The pump comprises an air gap forming an acoustic cavity 103, bounded by side walls 107, an end wall 112, and an actuator 200. The motion of the actuator drives a pressure wave 300 in the air of the acoustic cavity 103. This pressure will typically vary with both time and with position within the acoustic cavity. Air may enter and leave the cavity in one of three ways—via a hole 121 in one of the walls or the actuator; via an inlet valve 8 in one of the walls or the actuator; or via an outlet valve 9 in one of the walls or the actuator. When the pressure inside the cavity near a hole or valve is greater than the pressure on the other side of the hole or valve, gas can flow from the cavity through a hole 121 or across an outlet valve 9. Conversely, when the pressure inside the cavity near a hole or valve is lower than the pressure on the other side of the hole or valve, gas can flow into the cavity through a hole 121 or across an inlet valve 8. Through a combination of an inlet valve and an outlet valve, gas is drawn into the cavity through the inlet valve when the cavity pressure is lower than the pressure on the other side of the inlet valve, then expelled from the cavity through the outlet valve when the cavity pressure is higher than the pressure on the other side of the outlet valve. An equivalent process occurs if an inlet valve and a carefully positioned hole are used (with a flow of gas from the inlet to the hole), and if an outlet valve and a carefully positioned hole are used (with a flow of gas from the hole to the outlet). These arrangements form the basis for the gas-pumping mechanism in an acoustic micropump.

Figure 2I:
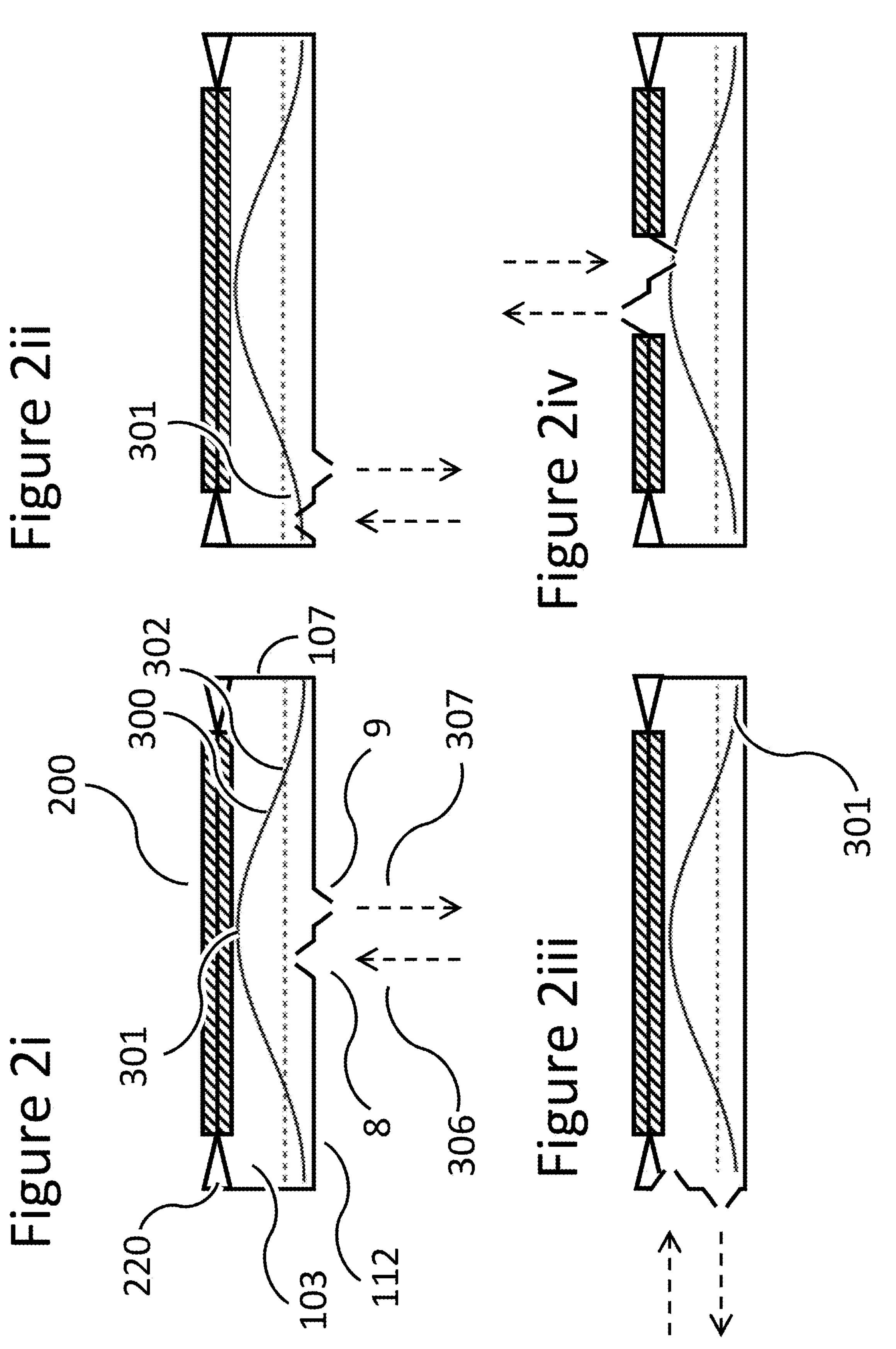
FIGS. 2*i*, 2*ii*, 2*iii*, and 2*iv* show several examples of locations for the placement of two half-wave rectifying valves, combined side-by-side into a single composite structure and with their rectifying directions opposed to form a split valve, in a single acoustic cavity operating at the fundamental cylindrical pressure mode.

FIGS. 2*i-iv* show four configurations that allow full-wave pressure rectification in a single substantially cylindrical acoustic cavity 103 where the forwards-rectifying and the reverse-rectifying components are in close proximity. All four configurations contain:

A substantially cylindrical acoustic cavity 103, defined as the gas volume enclosed by a side wall 107, an actuator 200, and an end wall 112. Oscillations of the actuator 200 produces a spatially varying pressure wave 300 in the enclosed gas, comprising pressure nodes 302 and pressure antinodes 301. The motion of the actuator is isolated from the body by a flexible support ("isolator" 220) such that to first approximation the actuator oscillates about its centre of mass.

An inlet valve 8 and an outlet valve 9, each of which rectifies one half of the pressure wave. These valves are preferentially positioned away from the pressure nodes 302, more preferably positioned at the pressure antinodes 301. In these four illustrated configurations, both the inlet 8 and outlet 9 valves are positioned together at the same pressure antinodes 301.

A gas flow 306 into the inlet valve 8, and a gas flow 307 out of the outlet valve 9.

Each design shown in FIGS. 2*i-iv* show a different location for the inlet valve 8 and the outlet valve 9 to be placed within the cavity 103. These are:

i. Close to the centre of the end wall 112 of the cavity 103, near the pressure antinode 301;
ii. Close to the edge of the end wall 112 of the cavity near the pressure antinode 301;
iii. Mounted in the side wall 107 of the cavity near the pressure antinode 301;
iv. Mounted in the actuator 200 near the pressure antinode 301.

The inlet valve 8 and outlet valve 9 may be distinct from one another or may be combined into a common structure to form a split valve. Other viable locations for the inlet 8 and outlet 9 valves are:

At the edge of the actuator 200, close to the pressure antinode 301 at the edge of the cavity;

Mounted on or in the isolator 220, close to the pressure antinode 301 at the edge of the cavity.

Constructed as an integral part of isolator 220, close to the pressure antinode 301 at the edge of the cavity.

Figure 3I:
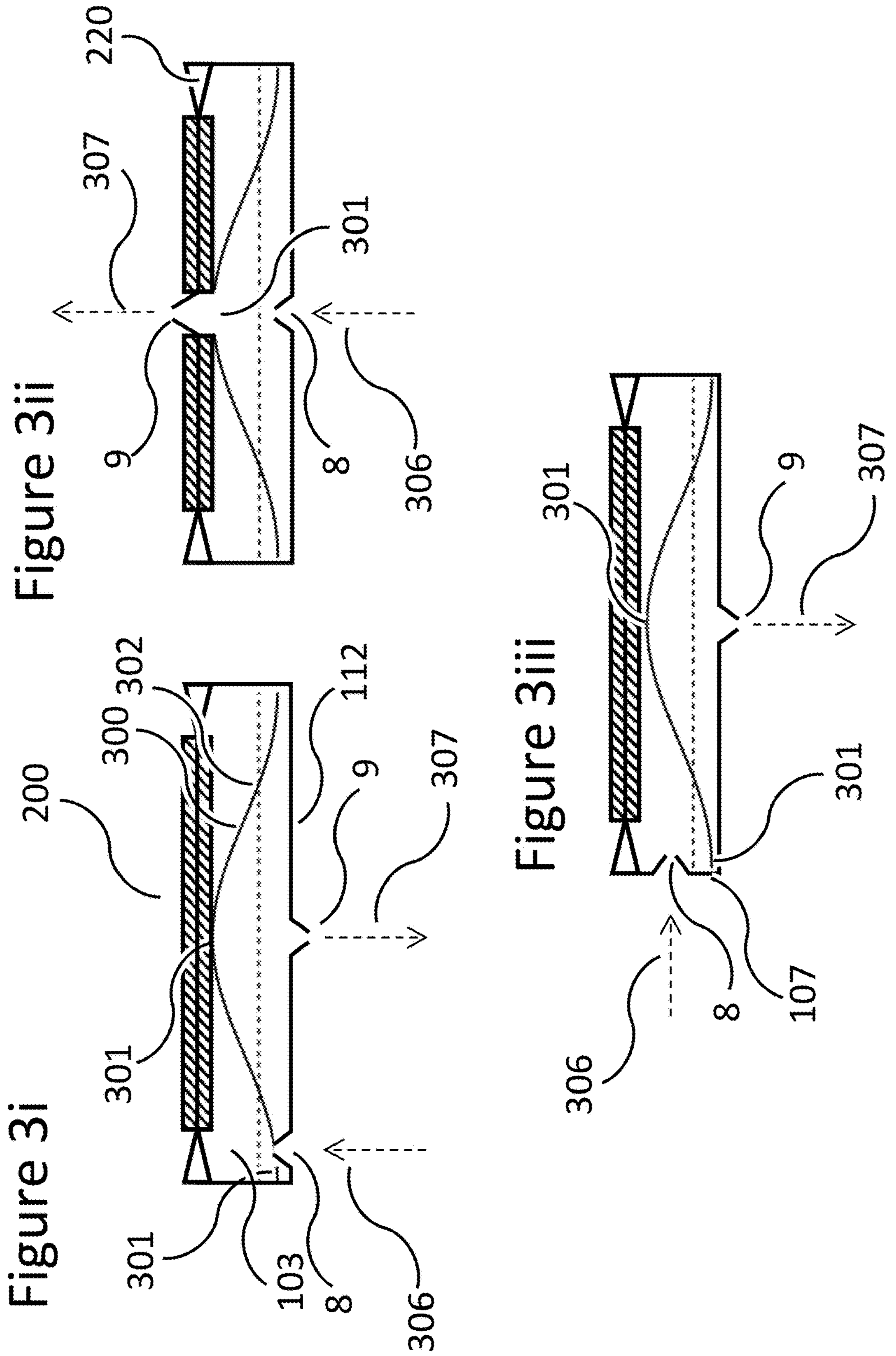
FIGS. 3*i*, 3*ii*, and 3*iii* show examples of locations for the placement of two distinct half-wave rectifying valves in a single acoustic cavity operating at the fundamental cylindrical pressure mode.

FIGS. 3*i-iii* show three configurations that allow full-wave pressure rectification in a single substantially cylindrical acoustic cavity 103 where the forwards-rectifying and the reverse-rectifying components are situated at different locations within the cavity 103. All 3 configurations contain:

A substantially cylindrical acoustic cavity 103, defined as the gas volume enclosed by a side wall 107, an actuator 200, and an end wall 112. Oscillations of the actuator 200 produce a spatially varying pressure wave 300 in the enclosed gas, comprising pressure nodes 302 and pressure antinodes 301. The motion of the actuator is isolated from the body by an isolator 220 such that to first approximation the actuator oscillates about its centre of mass.

An inlet valve 8 and an outlet valve 9, each of which rectifies one half of the pressure wave.

These valves are preferentially positioned away from the pressure nodes 302, more preferably positioned at the pressure antinodes 301. In the configurations shown in FIGS. 3*i-iii*, the inlet 8 and outlet 9 valves are positioned at substantially different locations within the pump interior.

A gas flow 306 into the inlet valve 8, and a gas flow 307 out of the outlet valve 9.

Each sub-figure in FIGS. 3*i-iii* illustrate a different set of locations for the inlet valve 8 and the outlet valve 9 to be placed within the cavity 103. These are:

i. With one valve at the centre of the end wall 112 of the cavity 103, and the other valve at the edge of the end wall 112;
ii. With one valve at the centre of the end wall 112 of the cavity 103, and the other valve in the centre of the actuator 200;
iii. With one valve at the centre of the end wall 112 of the cavity 103, and the other valve in the side-wall 107 of the cavity 103.

Note that the locations of the inlet 8 and outlet 9 valves can be freely interchanged without affecting the performance of the pump beyond reversing the pumping direction. In addition to the specific permutations highlighted in FIGS. 3*i-iii*, an inlet valve 8 or outlet valve 9 may be placed in or close to any of the following locations:

At the centre of the cavity, located in the end wall 112;
At the edge of the cavity, located in the end wall 112;
At the centre of the actuator 200;
At the edge of the actuator 200;
In the side wall of the cavity 107;
Within the isolator 220.

With valves suitably placed at one, some, or all of the locations above, one skilled in the art will realise that the pump will perform full-wave rectification of the pressure wave in the acoustic cavity 103.

Figure 4I:
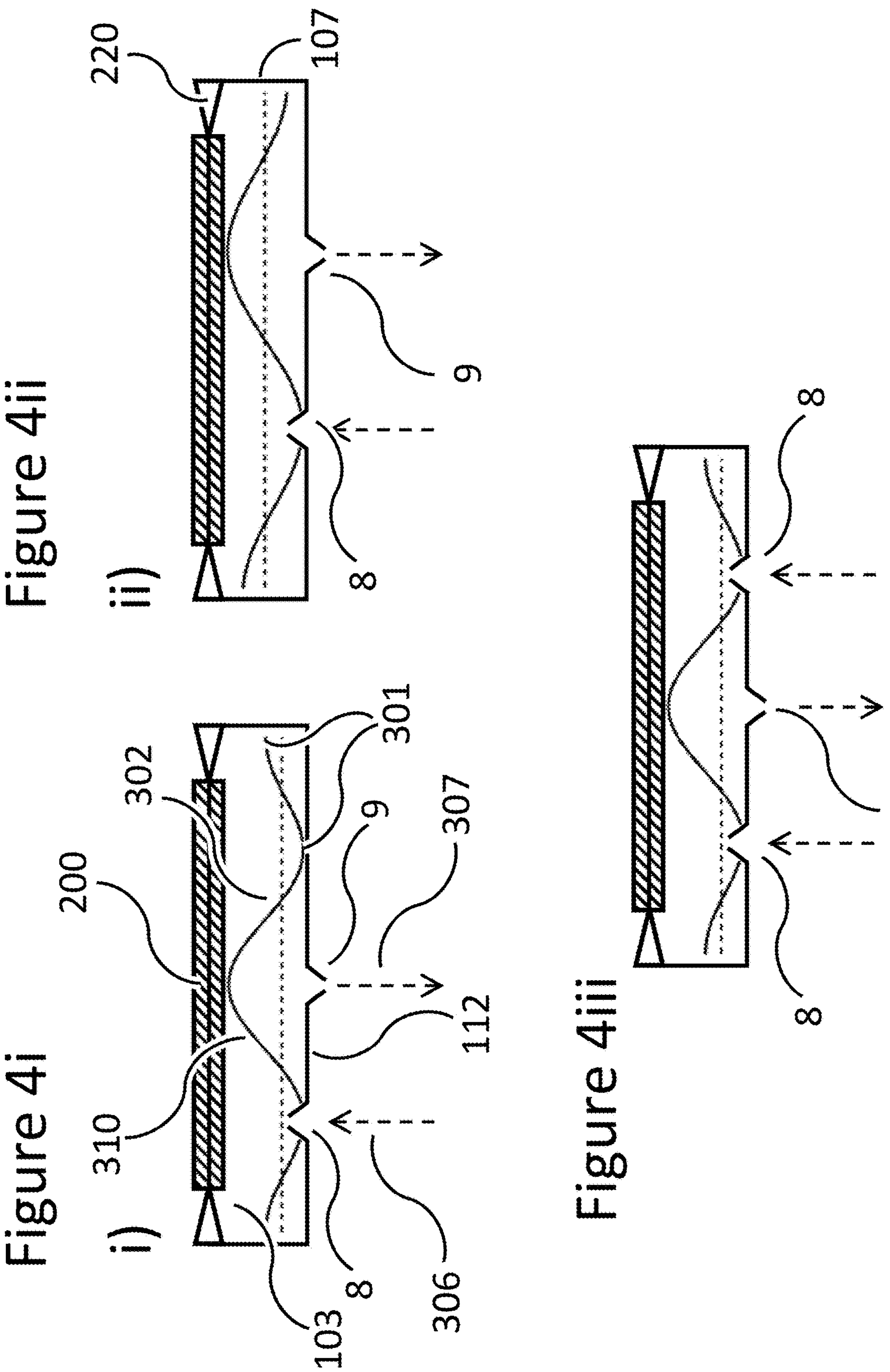
FIGS. 4*i*, 4*ii*, and 4*iii* show examples of locations for the placement of two distinct half-wave rectifying valves in a single acoustic cavity, where the cavity is supporting a higher-order pressure mode.

FIGS. 4*i-iii* show 3 configurations that allow full-wave pressure rectification where the pressure mode is not the fundamental acoustic mode of a substantially cylindrical cavity.

i. Shows a substantially cylindrical cavity 103 where the actuator 200 has excited the second-order axisymmetric pressure mode 310 of the cavity. An outlet valve 9 is positioned at a central pressure antinode 301, and an inlet valve 8 is positioned on one of the annular antinodal rings 301 away from the pump centre. In general, a cylindrically symmetrical pressure mode of order m will support 2m+1 antinodes, giving 4m+4 possible locations for inlet 8 and outlet 9 valves to be placed (on the cavity end wall 112 and on the actuator 200, above and below the antinode 301, on the edge wall 107 at the extremal pressure antinode, and mounted on or in the isolator 220). There are therefore 4m+4 potential mounting locations for a split valve within a cavity supporting a mode of order m (as enumerated above), and $16(m^2+2m+1)$ distinct permutations of inlet 8 and outlet 9 valve locations.

ii. Shows an actuator driving an asymmetric pressure mode within a cavity, enabling further locations for the positioning of inlet 8 and outlet 9 valves. Pumps capable of driving asymmetric pressure modes have previously been disclosed in US2014050604, with the benefit of increasing the separation between the pressure antinodes whilst still operating at inaudible frequencies. Therefore, a full-wave rectifying pump utilising an asymmetric cavity mode would also benefit from increased manufacturability through the loosening of close tolerances. This asymmetry may be generated by
  - Using an acoustic cavity that lacks cylindrical symmetry around its perimeter 107;
  - Using an acoustic cavity that lacks cylindrical symmetry at its end walls 112;
  - Using an actuator 300 that lacks cylindrical symmetry.

iii. Shows a cavity supporting a higher-order pressure mode 300 where more than two valves have been placed in pressure antinodes 301.

One skilled in the art will recognise that any number and combination of inlet valves 8, outlet valves 9, and split valves 11 may be placed close to the pressure antinodes arising in an acoustic cavity and will function in a substantially similar way to the arrangements discussed above. These may be placed within acoustic cavities supporting fundamental modes, higher order modes, or linear or non-linear combinations therein, and these modes may be symmetric or asymmetric without fundamentally changing the operation of the pump disclosed here.

Figure 5I:
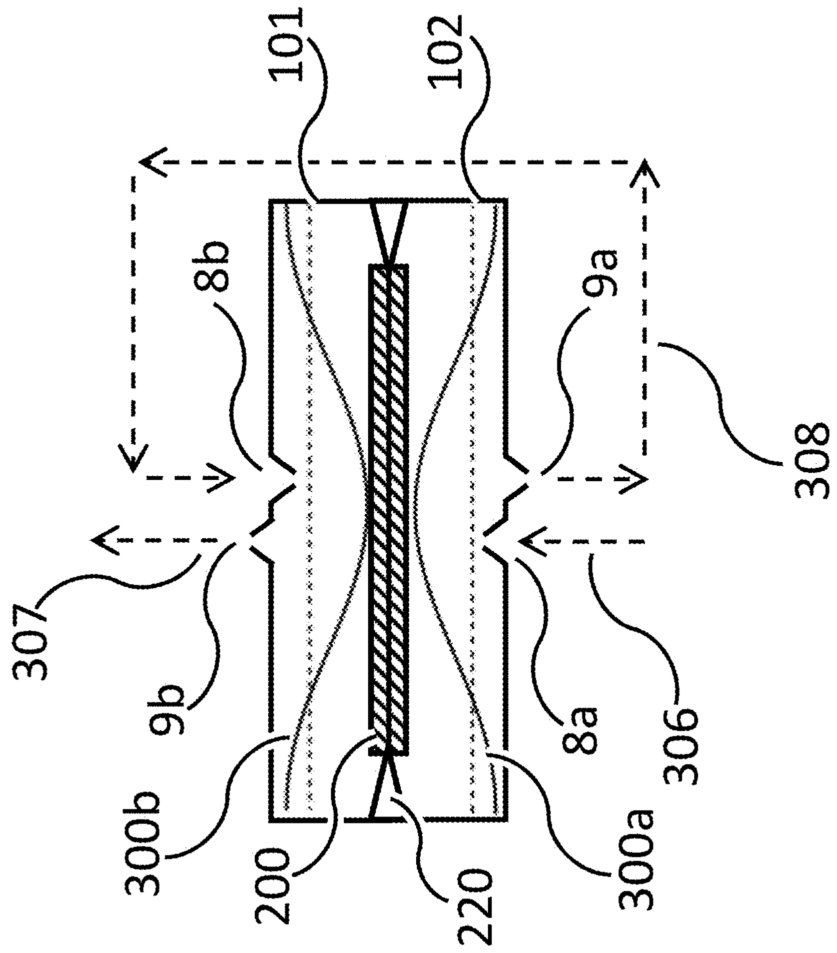
FIGS. 5*i* and 5*ii* show two examples of single-cavity full-wave rectifying pumps described in FIGS. 2-4 combined into a double-cavity full-wave rectifying pump.
Figure 5:
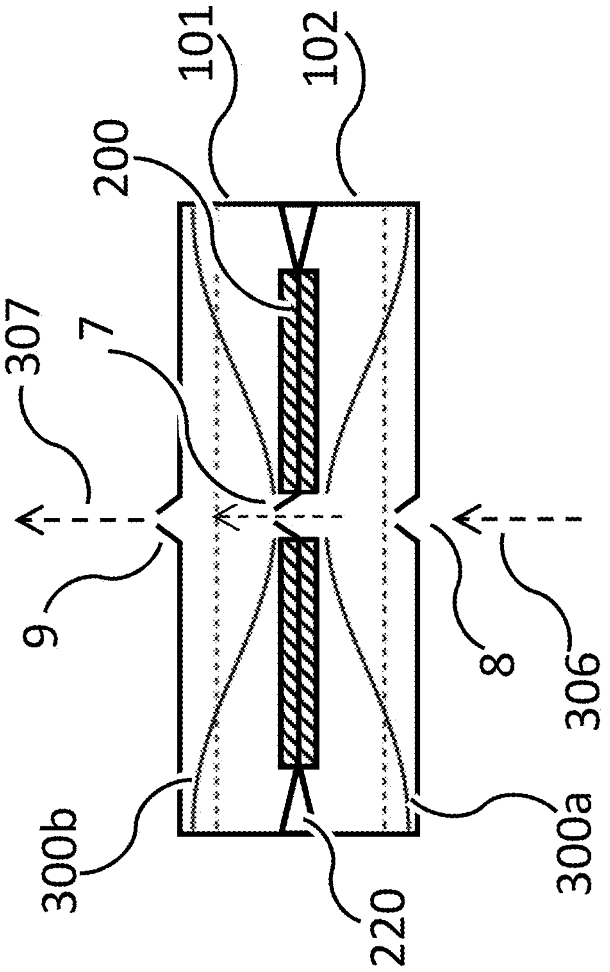

FIGS. 5*i-ii* show examples of two-cavity full-wave rectification pumps. Both pumps share the following common features. An upper pump body 101 and a lower pump body 102 are placed on either side of an actuator 200 such that two substantially cylindrical acoustic cavities are formed. An acoustic pressure wave 300*a* is formed in the lower cavity 102 and a second acoustic pressure wave 300*b* is formed in the upper cavity 101, with both pressure waves being driven by the oscillation of the actuator. Due to the symmetry of the design, the pressure wave in the upper cavity is approximately 180 degrees out of phase with the wave in the lower cavity. Valves placed at the pressure antinodes rectify the pressure wave as in the single-cavity case. The arrangements are:

i. a two-cavity four-valve configuration, comprising two single-cavity configurations as shown in FIG. 2*i* placed back-to-back, with the outlet valve 9*a* of the lower pump body 102 connected to the inlet valve 8*b* of the upper pump body 101. The manifolded flow 308 forms a pneumatic connection between the upper and lower cavity so that there is only a single flow path through the pump from inlet 306 to outlet 307. This configuration has the advantage that it is not sensitive to the relative phasing between the upper and lower cavity, so any combination of two single cavities shown in FIGS. 2*i-iv*, 3, and 4 can be connected in this manner to form a two-cavity full-wave rectification pump.

ii. a three-valve two-cavity pump configuration that can be used to rectify the pressure wave in both cavities. A common inlet/outlet valve 7 allows for communication between the upper 101 and lower 102 cavities and is mounted in the centre of the actuator 200 to rectify the largest pressure differential in the pump.

Particular arrangements of full-wave pressure rectification pumps according to the present disclosure will now be discussed.

Figure 6:
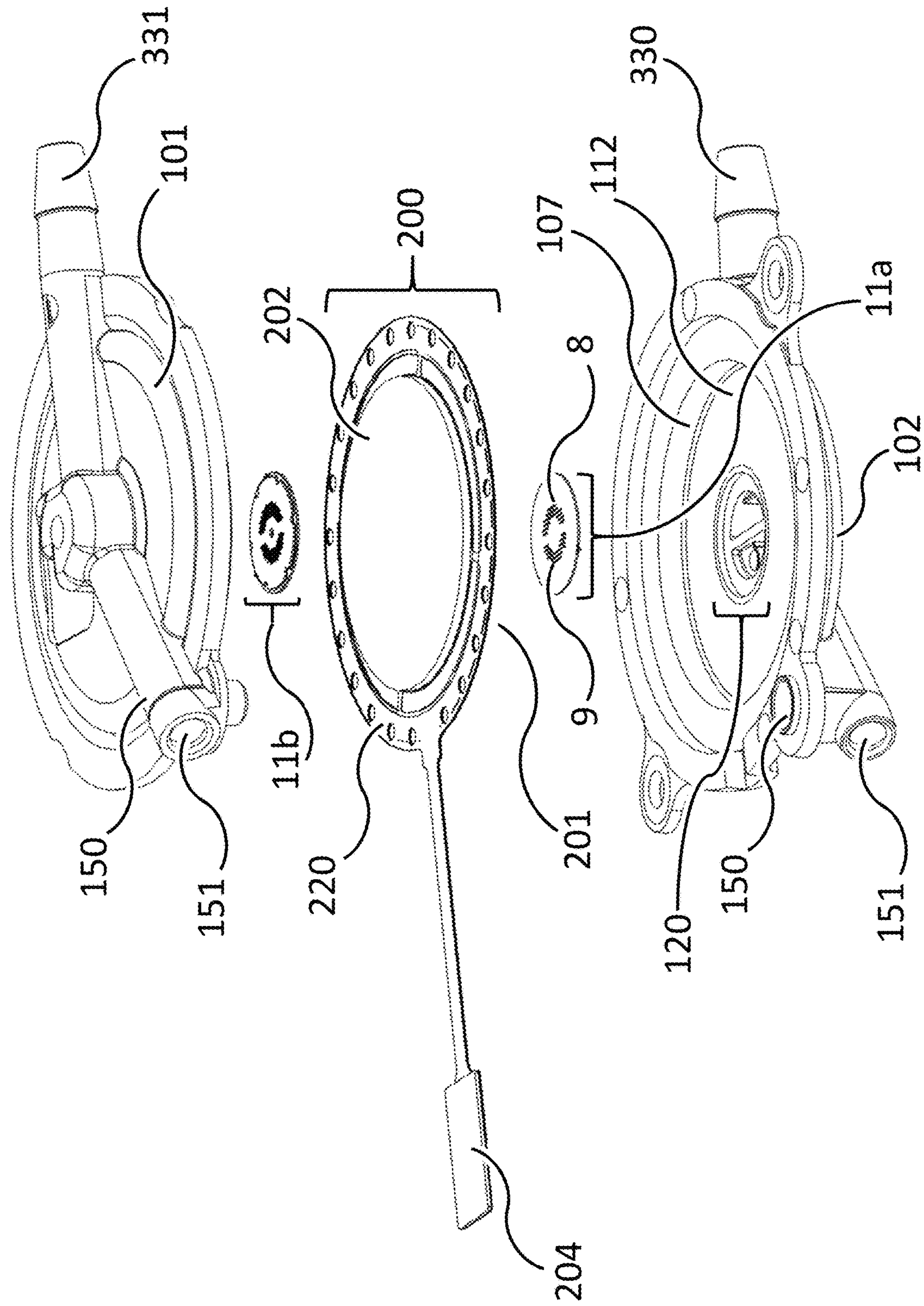
FIG. 6 shows an exploded view of a high-pressure pump that utilizes one split valve per acoustic cavity to perform full-wave rectification.

FIG. 6 shows an exploded view of a two-cavity full-wave pressure rectification pump. This design follows the same general structure shown in FIG. 5*i*, with specific features added to aid manufacturability. The pump comprises:

An upper 101 and lower 102 pump body, both containing substantially cylindrical acoustic cavities defined by the air volume encapsulated between the actuator, the cavity side wall 107, and the cavity end wall 112.
  - Pump bodies may be made of any material including metals, alloys, plastics, semiconductors, crystalline solids such as sapphire or diamond, or other composites, laminates, or combinations of these materials.
  - Pump bodies may be formed by moulding; machining; additive manufacturing processes such as stereolithography, extrusion, or sintering; hot isostatic pressing; deposition (via chemical vapour or otherwise); mixing, encapsulation, or lamination; or other assembly methods of separate components.
  - Preferably the pump bodies are made of a stiff, moulded plastic (e.g. IXEF).

Said upper 101 and lower 102 pump bodies arranged around a central actuator 200, to form a two-cavity configuration with a shared actuator.
  - Actuators may be constructed from uniformly poled piezoelectric material; composites or laminates of piezoelectric and inert materials as are used in piezoelectric unimorphs; or composites or laminates of differently poled piezoelectric materials as are in piezoelectric bimorphs. More generally, actuators may be constructed that operate electrically, magnetically, thermally, optically, sonically, acoustically, hydrodynamically, or osmotically.
  - Electrical contact to a piezoelectric, electrical, magnetic, or electrostatic actuator may be made through externally soldered features, sprung-loaded contacts, mechanical contacts, flexible circuitry, or via electrical induction.
  - Preferably the actuator is a unimorph constructed from layer of piezoelectric material 201 bonded to a substrate layer 202, which may be a disc of metal such as aluminium, steel, or titanium.

The central actuator 200 being disposed between the upper pump body 101 and lower pump body 102 by means of an isolator 220.
  - The isolator may be of comparable rigidity to the actuator in which case the centre of mass of the actuator will displace during operation, or may be substantially less rigid than the actuator in which case the actuator will, to first approximation, oscillate about its centre of mass.
  - The isolator may provide a pneumatic seal between the upper pump body 101 and the lower pump body 102. This functionality may be enhanced via compliant coatings, gaskets, space-filling adhesives, and soft space-filling liquids such as silicone sealant.
  - The isolator may provide an electrical connection to one or more of the actuator electrodes. This may be accomplished via single- or double-sided conductive tracks; said tracks may be constructed from metals, electrically conductive plastics, semiconductors, or suspensions of conductive materials encased in adhesive.

The isolator may provide structural support to the actuator during operation. This can be achieved through the part-etching or otherwise selective thickness control of vulnerable regions, the patterning of support features into the isolator, or through the addition of one or more new laminar layers to the isolator structure.

Preferably the isolator 220 constitutes a flexible circuit which allows centre-of-mass oscillation of the composite disc; the isolator, piezoelectric material, and aluminium disc are bonded with adhesive. The flexible circuit may contain through-holes close to its perimeter to aid the adhesion of the actuator assembly to the pump bodies 101 and 102. The flexible circuit provides electrical connection from the PZT 201 to a drive connection 204 external to the pump assembly.

The adhesion between the upper pump body 101, lower pump body 102, and the actuator 200 being ensured via glues, ultrasonic welding, laser welding, mechanical joins such as screws or clips, or pressure-sensitive adhesive.

Preferably the upper pump body 101, lower pump body 102, and actuator 200 are bonded together using UV curing adhesive.

The gas-tightness of the structure being ensured through the use of glues, ultrasonic welding, laser welding, mechanical gaskets or O-rings, or pressure-sensitive adhesive.

Preferably the upper pump body 101 is made gas-tight from the lower pump body 102 via a UV curing adhesive bead.

Valve recesses 120 in both the upper 101 and lower 102 pump bodies, placed at the centre of the cavity end walls 112;

This valve recess may permit an isolated inlet valve 8, and isolated outlet valve 9, a combination of inlet valves 8 and outlet valves 9, a split valve 11, or a combination of split valves 11, inlet valves 8, and outlet valves 9.

The valve or valves may be secured within the valve recess through the use of adhesives, welding (conventional, laser, or ultrasonic), interference fitting, or mechanical contact.

The valve recess may contain specific features to aid the retention of the valve or valves placed within it. These may include cosmetic markings to aid camera recognition, proud or recessed sections, regions with selectively smooth or rough surface finish, regions containing different materials, or regions designed to overlap the valve following construction.

Preferably each valve recess 120 is shaped to fit a single split valve 11. The split valve is secured within the recess using adhesive, and surfaces of the valve recess are treated to increase the strength of the bond.

Alternatively, the valve may be formed as part of a laminar structure defining part or all of the cavity end wall 112 or cavity side wall 107. In this arrangement, the valve recess is not required.

One or more valves positioned within the valve recess 120 of the lower moulding 102, and one or more valves positioned within the valve recess 120 of the upper moulding 101.

The valves within the valve recess 120 may comprise none, one, or more inlet 8 outlet 9 and split valves 11.

The valve or valves may contain rigid materials, flexible materials, or a combination of both rigid and flexible materials. Rigid materials may include metals such as steel, titanium, or aluminium; plastics such as IXEF or PEEK; crystalline structures such as sapphire; semiconductors; or other laminates or composites of these materials. Flexible materials may include thinner or ductile metals; flexible plastics such as polyimide, acrylic, or BoPET; graphene; or fibrous materials like Kevlar.

The valve or valves may contain holes, channels, vias, or apertures in any of their constituent rigid or flexible parts. These features may be formed through etching, additive processes, laser ablation, coatings, photolithography, through the lamination of distinct layers, or through mechanical processes.

Valves may be held in place by glues, ultrasonic welding, laser welding, mechanical gaskets or O-rings, or pressure-sensitive adhesive.

Preferably the valve recess 120 of the lower moulding 102 contains a single split valve 11. This split valve 11 contains a mixture of rigid and flexible layers; the rigid layers are formed from steel and the flexible layer is formed from BoPET. The valve is held in place using a UV curing adhesive bead.

Manifolding 150, comprising a gas-tight channel connecting the outlet portion 9 of a split valve 11*a* within the valve recess 120 in the lower moulding 102 to the inlet portion 8 of a split valve 11*b* within the valve recess 120 in the upper moulding 101.

This channel may be of any shape and internal dimensions, and may be formed from external tubes or inserts, parts bonded to the pump at the time of manufacture, or integral parts of the moulding.

Integral manifolding may include channels or paths, direct or labyrinthine, that upon assembly of the pump form one or more gas-tight paths between valves 11*b* in the upper pump body 101 and valves 11*a* in the lower pump body 102. These may be constructed using the same manufacturing techniques used in the production of the pump bodies, or may involve secondary processes such as CNC machining, laser machining, or overmoulding.

Separate manifolding may include tubing affixed to the pump using barbs, glue, or welds; moulded or machined inserts; or moulded or machined parts that are joined to the pump and made gas-tight through gaskets, O-rings, glue, or ultrasonic welding.

Preferably the manifolding comprises a radial bore located within the lower moulding 102, an axial bore located within the lower moulding containing a socket, an axial bore located within the upper moulding 101 containing a pin, and a radial bore located within the upper moulding. Upon assembly, the pin and the socket form mating parts and are made gas-tight using adhesive, thereby forming a continuous U-shaped channel. The open ends of the radial bores are sealed using nitrile rubber spheres 151.

An inlet channel 330 located within the lower moulding 102, and an outlet channel located within the upper moulding 101.

Both the inlet and outlet channel contain external barbs or ridges to provide firm and leak-free integration with external features.

In FIG. 6, the actuator assembly 200 is shown in an orientation where the substrate layer 202 faces the upper moulding 101 and the piezoelectric layer 201 faces the lower moulding 102. Other orientations of the actuator assembly 200 may be desirable instead, for example where the piezoelectric layer 201 faces the upper moulding 101 and the substrate layer 202 faces the lower moulding 102. One such case is shown diagrammatically in FIGS. 23-25.

The unique configuration of the pump imposes a number of design challenges specific to this arrangement. For arrangements that utilise an adhesive bead to secure the valve 11 or valves 8, 9 into the valve recess 120, a concern is the spread of adhesive across the valve surface and into any of the holes 21 in the lower valve plate 15. Adhesive intrusion into the valve will impair the action of the motive flap 17, preventing efficient valving and therefore reducing the pneumatic performance of the device. To address this, the recess may contain features to control the spread of glue during valve insertion, tamping, and curing.

FIGS. 7*i-iii* show valve recess designs that limit, impair, or prevent the spread of adhesive towards the holes 21 in the lower valve plate 15. The annular sealing surface 122 is highlighted, but the designs illustrated here are equally valid for the sealing diameter.

In one arrangement (FIG. 7*i*), stand-offs 130 may be placed inside the valve recess which limit or otherwise control the depth that a valve 11 or valves 8, 9 can be inserted into the recess 120. This provides fine control over the spread of glue 318 towards the valve holes by fixing the maximum compression of the glue layer. The stand-off profile may be across the entirety of the valve recess or may be an intermittent pattern that allows glue to flow between the stand-offs. The profile of the stand-offs may be rectilinear, circular, or tapered as needed;

In a second arrangement (FIG. 7 *ii*), a trench 132 inside the valve recess 120 encapsulates a glue fillet and directs excess glue away from valve features during tamping via escape channels. This trench may be across some or all of the valve recess 120 as required, and may have a rectilinear, rounded, or tapered profile.

In a preferred arrangement (FIG. 7 *iii*), the application of a selective surface finish 133 on regions of the gluing surface of the valve recess 120 encourages either wetting away from the lower plate 15 holes or beading near to the lower plate 15 holes. This finish may be achieved by mould tool roughness or smoothness, post-processing such as bead-blasting, or the application of coatings to change the surface energy.

A second challenge arises from the requirements on the pneumatic connection between the outlet side of a split valve within a valve recess in the lower moulding, and the inlet side of a split valve within a valve recess in the upper moulding. To enable the tight integration of the pump into devices it is desirable that the manifolding 150 be incorporated into the lower 102 and upper 101 mouldings, rather than being joined using external tubing. The manifolding passes around the central cavity of the pump so, in order to save as much space as possible, it is desirable that the manifolding forms a tight U-shaped channel once the pump has been assembled. When the pump body is formed via moulding, any integrated channels will typically be formed through the insertion of retractable pins. When removed, these pins leave channels that are open on the exterior face of the pump. However, the pump includes the characteristic that the DC pressure generated within the lower cavity is maintained within the manifolding. Any open channels in the manifolding will prevent this and therefore reduce the pressure generated by the pump by approximately 50%.

Figure 8I:
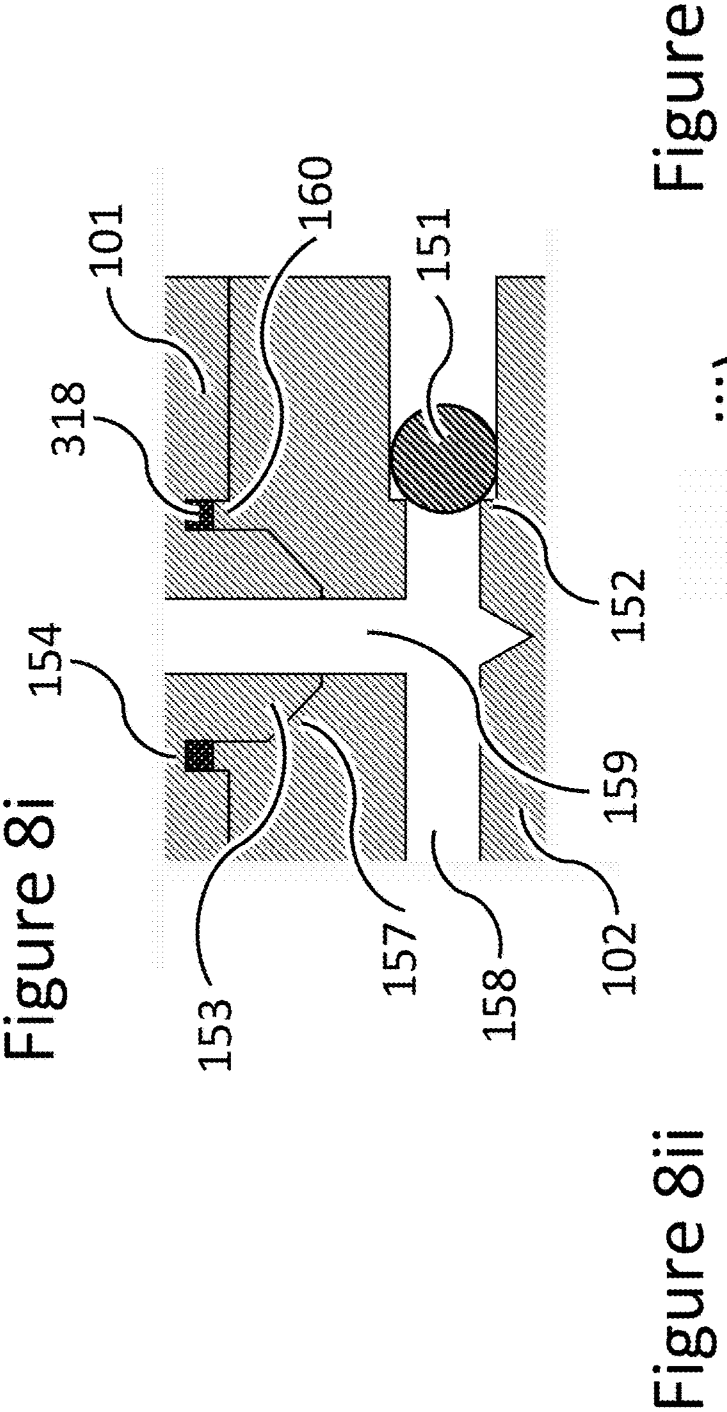
FIGS. 8*i*, 8*ii*, and 8*iii* show three examples of inter-cavity manifolding structures designed to transmit flow without losses due to DC leaks.
Figure 8I:
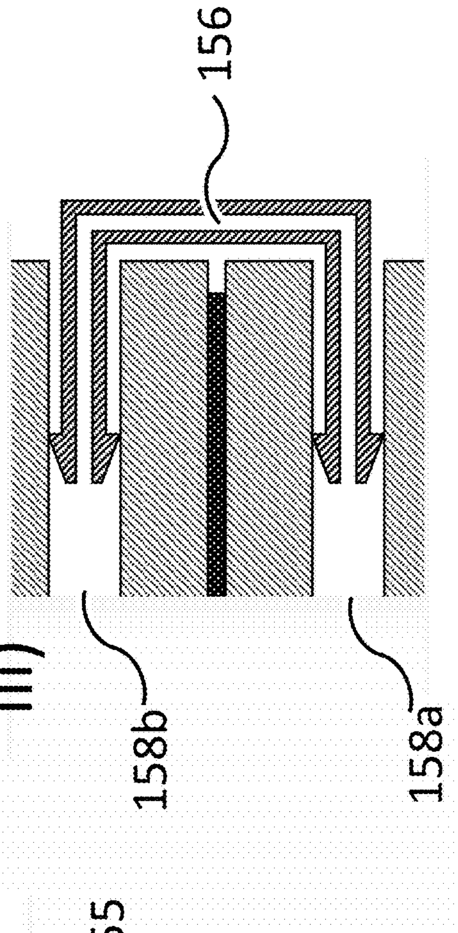
Figure 8I:
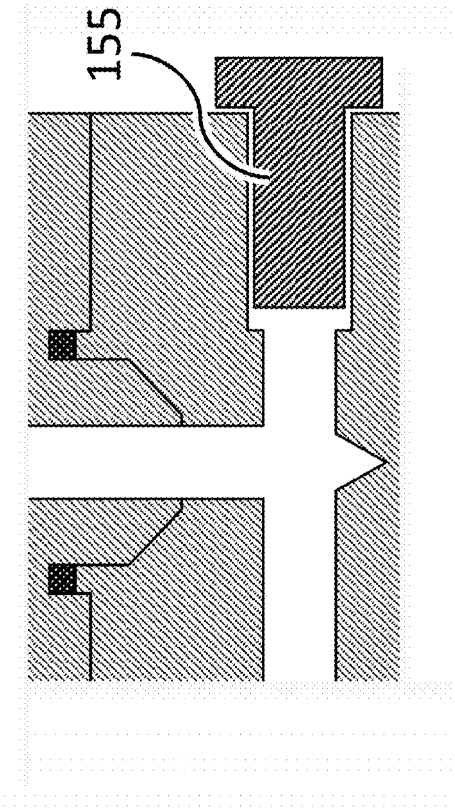

FIG. 8*i-iii* show manifolding designs that produce the pressurised U-channel described above.

FIG. 8*i* shows a side-on view of a preferred arrangement of the pressurised U-channel design. The assembled manifolding 150 comprises a radial bore 158, a two-part axial bore 159, and a second radial bore (not shown).

The lower moulding 102 contains a radial bore 158 extending radially outwards from the outlet portion of the split valve in the valve recess in the lower moulding. This bore is intersected by a perpendicular axial bore 159, which passes through the centre of the manifold hole 157. A raised edge 160 encapsulates the manifold hole 157.

The upper moulding 101 contains a radial bore 158 extending radially inwards towards the inlet portion of the split valve in the valve recess in the upper moulding. This bore is intersected by a perpendicular axial bore 159, which passes through the centre of the manifold pin 153. The manifold pin 153 is surrounded by an adhesive trench 154.

Upon assembly, a layer of adhesive 318 is applied to the adhesive trench and the upper pump body 101 and lower pump body 102 are joined. The manifold pin 153 and manifold hole 157 form mating features, rotationally aligning the upper pump body 101 with respect to the lower 102 pump body and preventing adhesive from flowing into the axial bore 159. Additionally, the mating of the raised edge 160 with the adhesive trench 154 encourages the adhesive layer 318 to form a strong, gas-impermeable bond. A composite axial bore 159 is formed from the mating of the upper pump body 101 and lower pump body 102.

Assembly of the pump in this manner forms an H-shaped channel. To obtain the required U-shaped channel, the open ends of the radial bores 158 are sealed using close-fitting spheres 151. These spheres are inserted into the radial bores to a depth specified by the bore shoulder 152, beyond which the bore diameter narrows. This prevents obstruction of the axial bore 159 by the spheres.

The spheres 151 may be made from compliant materials, such as plastics or rubber or nitrile rubber, or from harder materials such as metal.

FIG. 8*ii* shows a second arrangement of the U-channel. The same mating features are retained from the arrangement shown in FIG. 8*i*, but the spheres are replaced by moulded secondary features ("plugs" 155), which are located by the cylindrical bore of the channel and internal shoulder features 152. These plugs can be retained by:

Frictional forces between the plug and the channel;

A glue bead between the plug and the channel;

A glue bead between the plug and the pump body;

Ultrasonic welding of the plug into the pump body;

Moulded retention features (such as barbs, clips and hooks) to increase the force required to remove the plug from the channel.

Alternatively, the plugs may be formed as part of the moulding process, either via two-shot moulding or overmoulding.

FIG. 8*iii* shows a third arrangement of the U-channel. The radial bore 158*a* in the lower moulding 102 is connected directly to the radial bore 158*b* in the upper moulding 101 using a close-fitting separately moulded feature ("external manifold") 156. These may be retained in the gas channels by Frictional forces between the external manifold and the channel;

A glue bead between the external manifold and the channel;

Moulded retention features (such as barbs, clips and hooks) to increase the force required to remove the external manifold from the channel.

As the external manifold simultaneously seals on both the radial bore in the upper moulding and the radial bore in the lower moulding, a solid external manifold will be over-constrained and hence may develop leaks due to assembly and manufacturing tolerances. Therefore, a degree of compliance is built into the manifold. If the manifold is constructed from a single part, then a soft material should be chosen to allow the part to deform appropriately and maintain the seal. If the manifold is constructed from a harder material, it can be constructed from two or more parts that can move relative to one another, allowing each part to maintain the seal on a single bore.

Figures 9A, 9B:
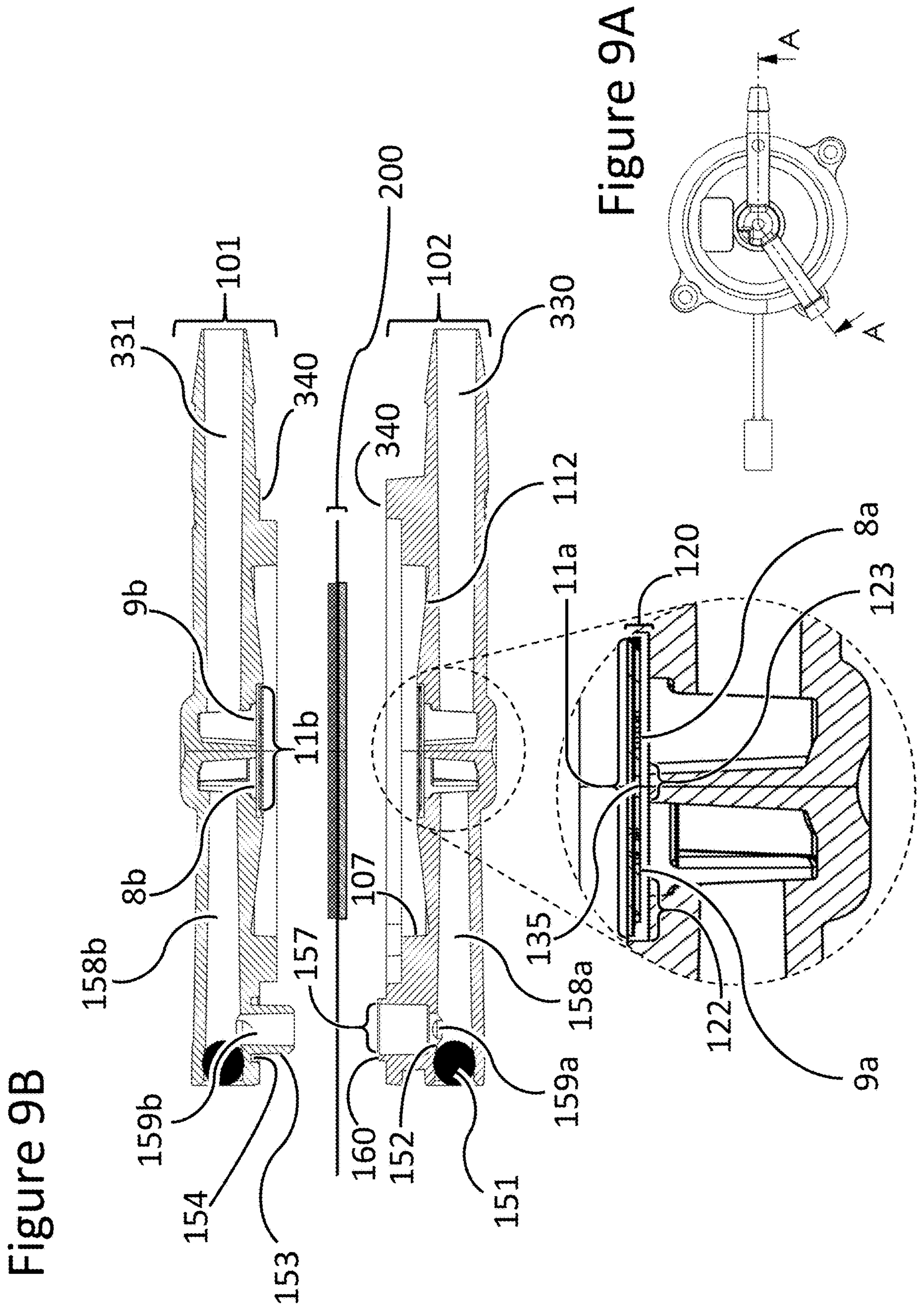
FIG. 9A shows a top view of an embodiment a high pressure pump with cross section line A-A and FIG. 9B shows a cross-sectioned view of the high-pressure pump along cross section line A-A with a detailed view extending therefrom.

The preferred arrangements of the valve recess 120 and the U-channel manifolding are shown in sectioned view in FIG. 9B. In this figure, the preferred pump arrangement shown in FIG. 6 has been sectioned along two planes—one along the plane joining the centres of the inlet channel 330 and outlet channel 331, and one along the plane joining the centres of the radial bores 158*a* and 158*b*—with the resulting section "A-A" shown in a flattened two-dimensional top view of FIG. 9A. The valve recess 120 in the lower moulding 102 is shown in an expanded view to aid clarity. This view also shows the path of the gas flow through the pump in its entirety. Shown are:

An upper 101 and lower 102 pump body, both containing and end wall 112 and a substantially cylindrical sidewall 107, arranged around a central actuator 200 to form two substantially cylindrical acoustic cavities;

Valve recesses 120 in both the upper 101 and lower 102 pump bodies, placed at the centre of the cavity end walls 112;

Said valve recesses 120 containing two sealing surfaces—an annulus extending around the perimeter of the recess 122, and a diameter extending across the centre of the recess 123;

Split valves 11 containing an inlet portion 8 and an outlet portion 9, where the inlet and outlet region are separated by an adhesion portion 135;

Split valves 11 placed and rotationally aligned such that the adhesion portion 135 is substantially overlapped with the sealing diameter 123, providing a pneumatic seal between the inlet 8 and outlet 9 sides of the valve;

An inlet channel 330 leading to the inlet portion 8*a* of the split valve 11*a* within the valve recess 120 of the lower pump moulding 102;

A radial bore 158*a* leading from the outlet portion 9*a* of the split valve 11*a* within the valve recess 120 of the lower pump moulding 102 to the axial bore 159*a;*

An axial bore 159*a* in the lower pump moulding 102, passing through the centre of the manifold hole 157 and being encapsulated by the raised edge 160;

An axial bore 159*b* in the upper pump moulding 101, passing through the centre of the manifold pin 153. The manifold pin 153 is surrounded by an adhesive trench 154;

The axial bore 159*b* in the upper pump moulding 101 leading to a radial bore 158*b*, which in turn leads to the inlet portion 8*b* of the split valve 11*b* within the valve recess 120 in the upper pump moulding 101;

An outlet channel 331 leading from the outlet portion 9*b* of the split valve 11*b* within the valve recess 120 of the upper pump moulding 101;

Nitrile rubber spheres 151 inserted in the open ends of the radial bores 158 and constrained by bore shoulders 152;

Annular surfaces 340 on both the upper 101 and lower 102 pump bodies where the structural integrity of the pump is maintained through a glue fillet.

Valves of the pumps will now be discussed.

Figure 10:
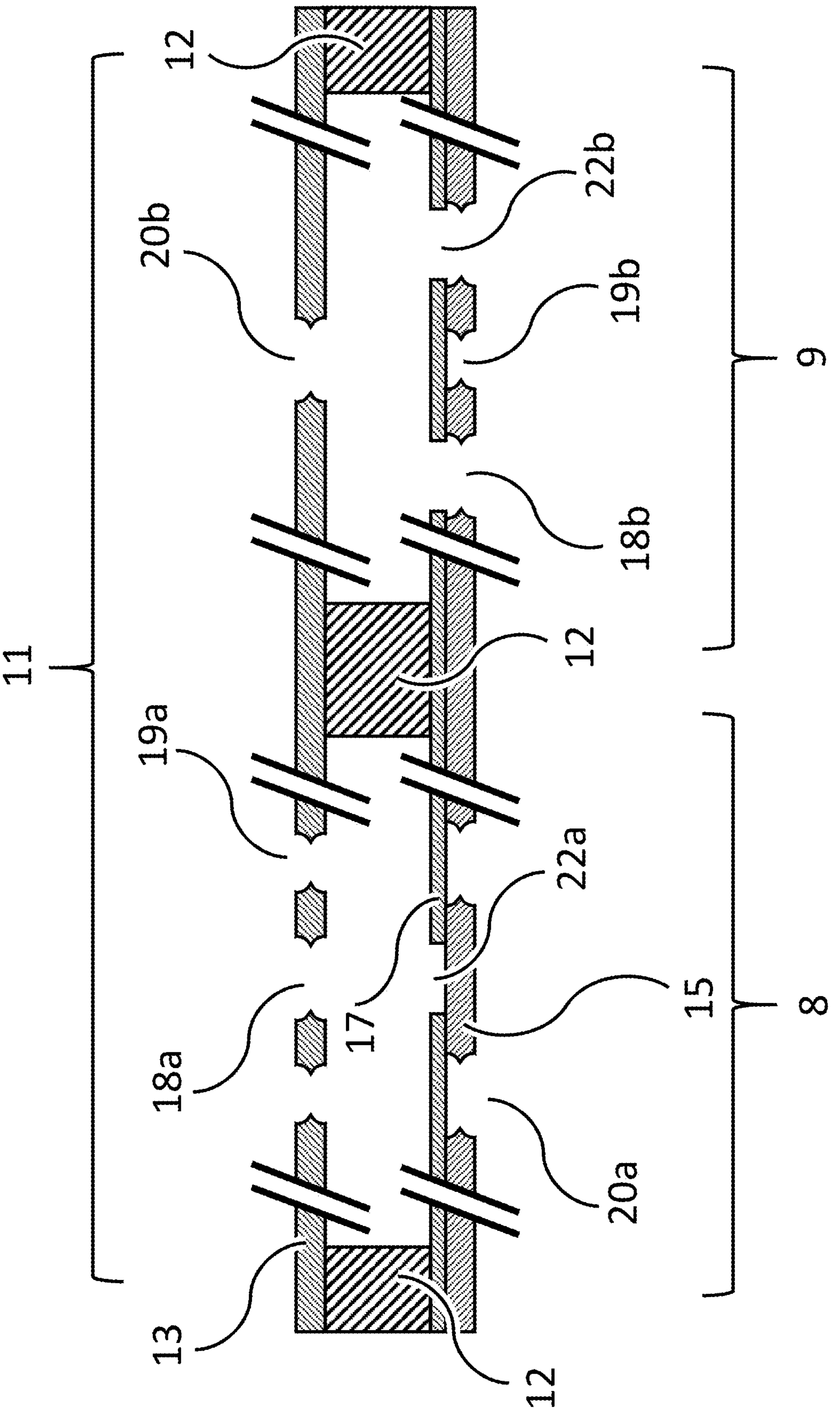
FIG. 10 shows a side-on cut through a split valve capable of performing full-wave rectification of an acoustic pressure oscillation.

FIG. 10 shows a side-on cut-through view of one arrangement of the split valve 11. The valve 11 comprises two working portions—an inlet portion 8, which allows flow to pass into the cavity when the AC cavity pressure is lower than the upstream pressure, and an outlet portion 9 which allows flow to pass from the cavity when the AC cavity pressure is greater than the downstream pressure. The two portions are separated by a central shim 12, which both prevents gas from flowing from the outlet 9 to the inlet 8 portions of the valve 11 and defines the spacing between the lower plate 15 and upper plate 13 within the valve. The lower plate 15, valve flap 17, shim 12, and upper plate 13 are all substantially parallel to one another, and their relative position is maintained by welded joins between the upper 13 and lower 15 plates. More generally, this alignment could be maintained by using glue, pressure-sensitive adhesive, solder, ultrasonically-welded joins, interference fits, or mechanical compression.

Both the inlet 8 and outlet 9 portions of the valve are of laminar construction, comprising a lower plate 15, an upper plate 13, a shim 12, and a motive flap 17 which can travel between the lower 15 and upper 13 plates when acted upon by an external force. Such a force may be provided by the pressure differential generated across the motive flap 17 by an acoustic cavity.

The inlet portion 8 of the SV 11 allows fluid to flow through the valve 11 when the flap 17 is pressed against the upper plate 13, and prevents fluid flow when the flap 17 is pressed against the lower plate 15. To achieve this, the upper plate 13, lower plate 15, and flap 17 contain holes in a certain pattern; these holes are named herein according to their functions. In portion 8, the lower plate 15 contains sealing holes 20*a* which are substantially misaligned from the valve flap holes 22*a*. The upper plate 13 contains open holes 18*a* which are substantially aligned with the valve flap holes 22*a*. The upper plate 13 also contains release holes 19*a*, which are substantially misaligned with the valve flap holes 22*a* and which increase the responsivity of the valve by exposing the flap 17 to the differential pressure even when pressed against the upper plate 13. The sealing holes 20*a*, valve flap holes 22*a*, open holes 18*a*, and release holes 19*a* are all substantially perpendicular to their respective surfaces.

The outlet portion 9 of the SV 11 allows fluid to flow through the valve 11 when the flap 17 is pressed against the lower plate 15, and prevents fluid flow when the flap 17 is pressed against the upper plate 13. To achieve this, the upper plate 13, lower plate 15, and flap 17 contain holes in a certain pattern; these holes are named herein according to their functions. The upper plate 13 contains sealing holes 20*b* which are substantially misaligned from the valve flap holes 22*b*. The lower plate 15 contains open holes 18*b* which are substantially aligned with the valve flap holes 22*b*. The lower plate 15 also contains release holes 19*b*, which are substantially misaligned with the valve flap holes 22*b* and which increase the responsivity of the valve. The sealing holes 20*b*, valve flap holes 22*b*, open holes 18*b*, and release holes 19*b* are all substantially perpendicular to their respective surfaces.

Figure 11I:
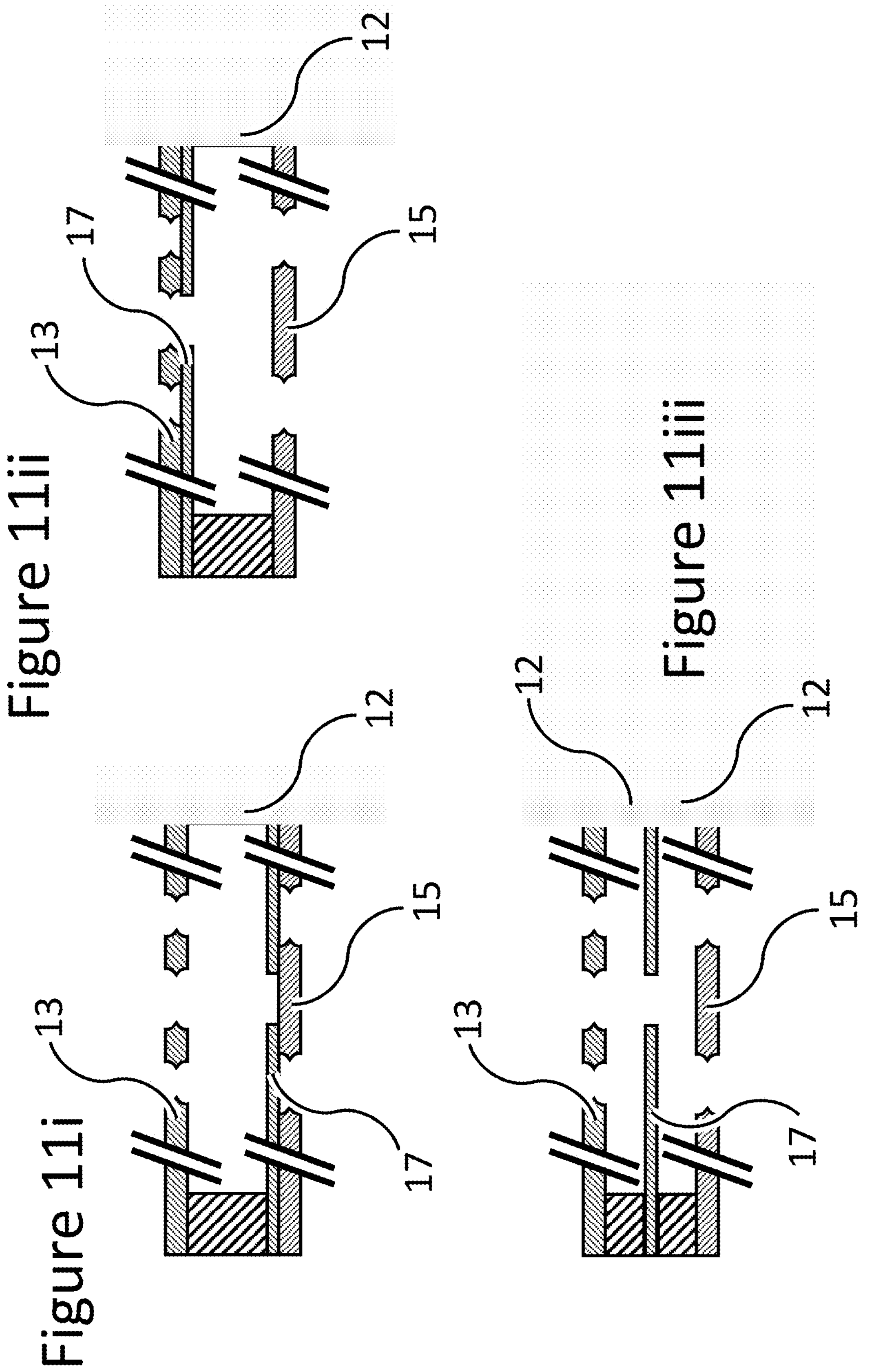
FIGS. 11*i*, 11*ii*, and 11*iii* show examples of bias orientations for a motive flap.

The arrangement of a split valve 11 shown in FIG. 10 shows the flap 17 held biased against the lower plate 15 on both the inlet 8 and outlet 9 side of the SV 11. This design may lead to leaks from the outlet portion 9 to the inlet portion 8 of the valve. When the flap is held against the upper plate 13, a leak path may develop between the lower plate 15 and the underside of the flap 17, travelling underneath the central region of the shim 12 and linking the inlet 8 and outlet 9 portions of the valve. This can substantially reduce the performance of a full-wave rectifying valve. Conversely, when the motive flap 17 is held against the lower plate 15 no such leak exists. In some applications, it is therefore desirable to utilise alternative bias positions of the flap 17; illustrations of these are shown in FIGS. 11*i-iii:* i. shows the flap 17 held biased against the lower plate 15, retained underneath the shim 12;
ii. shows the flap 17 held biased against the upper plate 13, retained on top of the shim 12;
iii. shows the flap 17 held unbiased against either the upper 13 or lower 15 plate, retained between a pair of shims 12.

The flap may be biased differently on the inlet 8 and outlet 9 sides of the SV 11 in order to form an effective pneumatic barrier between the two sides. For example, one possible SV design that addresses the leak issue discussed above might have the inlet portion 8 biased according to FIG. 11*i* and the outlet portion 9 biased according to FIG. 11*ii*.

In some embodiments, the split valve 11 is adequately sealed to prevent air leaks from the inlet 8 to the outlet 9 portion of the valve, from the outlet 9 to the cavity 103 side of the valve, and from the cavity 103 to the inlet 8 side of the valve. It is also held in the valve recess 120 with sufficient strength so as to prevent its displacement during the lifetime of the pump. In one preferred arrangement, the valve recess 120 is deeper than the thickness of the valve so that, after placement, the surface of the valve exposed to the acoustic cavity is flush or sub-flush with the pump body. The valve 11 is secured within the valve recess 120 using glue, and the space-filling features of the glue bead provide pneumatic isolation between the inlet 8, outlet 9, and cavity 103.

Figure 12:
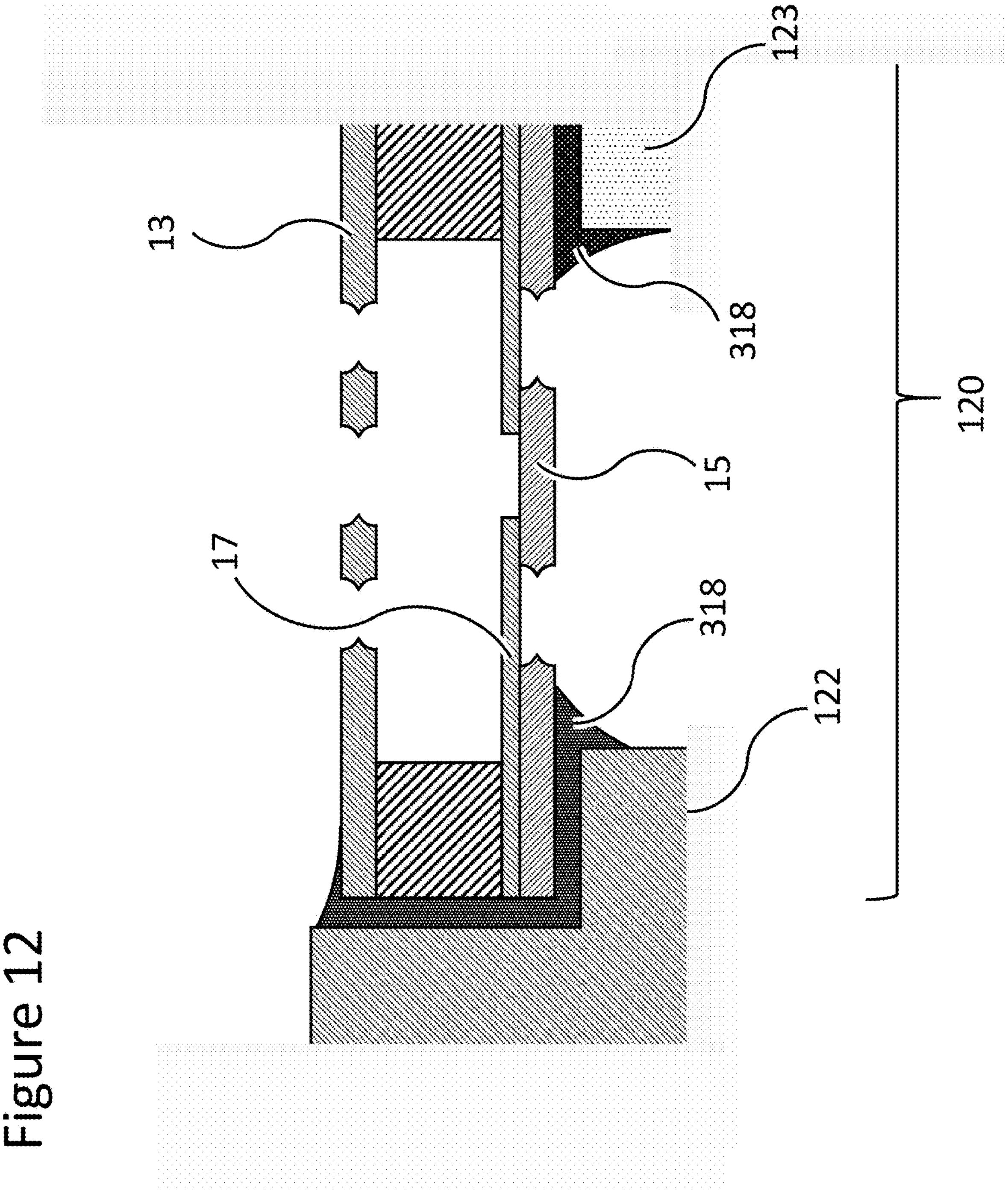
FIG. 12 shows various locations for glue ingress into the valve structure.

Using glue to secure an SV 11 into a valve recess 120, comprising both an annular sealing surface 122 and a sealing diameter 123, can be problematic. The potential problems are illustrated for the inlet 8 portion of the valve in FIG. 12; equivalent arguments hold for the outlet side 9. To reduce the stress in the flap 17 during sealing, it is beneficial to use an array of a large number of small holes in the upper 13 and lower 15 valve plates. Furthermore, it is beneficial for these holes to be as close to the pressure antinode as possible, in order to maximise the pressure differential across the valve flap and facilitate efficient operation of the valve. Conversely, sealing a split valve 11 into a valve recess 120 such that the inlet 8 and outlet 9 portions are pneumatically isolated includes a glue bead to pass along the sealing diameter 123, in close proximity to the hole array. When the valve 11 is placed into the valve recess 120 and tamped, it displaces the glue bead 318 towards the holes in the lower valve plate 15. On the inlet portion 8 of the split valve 11, this can lead to the ingress of glue into the sealing holes 20, whilst on the outlet portion 9 of the split valve 11 glue can enter the valve structure through both the open 18 and release 19 holes. Any glue 318 that reaches the inside of the valve can immobilise or otherwise impair the correct response of the flap 17, reducing the overall effectiveness of the valve 11. This issue is further compounded by the rotational alignment characteristic of the valve 11 relative to the sealing diameter 123. If the valve is substantially misaligned, the holes on the bottom plate 15 are brought into close proximity with the glue bead 318 lying along the sealing diameter 123, increasing the risk of glue 318 entering the inside of the valve.

Figure 13I:
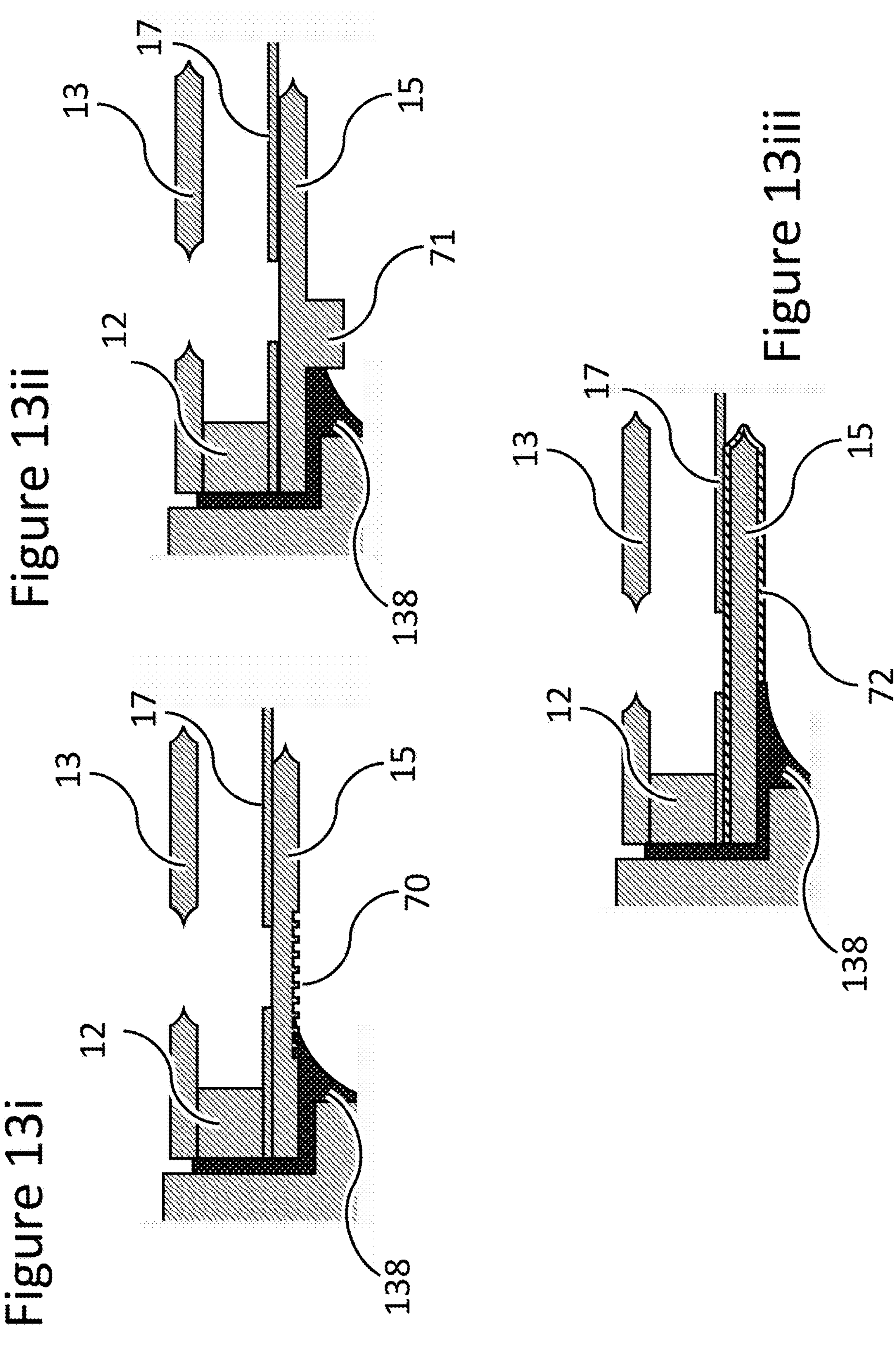
FIGS. 13*i*, 13*ii*, and 13*iii* show example additional valve features designed to reduce glue flow into the valve body.

In a preferred arrangement, the risk of glue ingress into the valve structure is reduced by maximising the clearance between the bottom plate 15 holes and the surfaces of the valve recess 120. The valve is designed to ensure that there is more than 0.3 mm clearance between the gluing surfaces, 122 and 123, and the edges of the sealing holes 20, the open holes 18, and the release holes 19. In conjunction with a suitable volume of glue, this design prevents glue ingress whilst still providing the pneumatic seal between the inlet 8 and outlet 9 portions of the valve. Other schemes to reduce glue ingress into a valve 11 are shown in FIGS. 13*i-iii*, and include:

i. The use of selective etching, part-etching, or local surface finishes 70 on the lower plate 15 to pin the glue fillet away from the lower plate holes;
ii. The use of proud features 71, produced by etching, part-etching, additive processes, or coatings, to provide a barrier to glue flow near the lower plate holes;
iii. The use of selective presence or absence of coatings 72 to reduce the surface energy of the lower plate 15, causing beading rather than wetting near the lower plate holes.

Figures 14I, 14V:
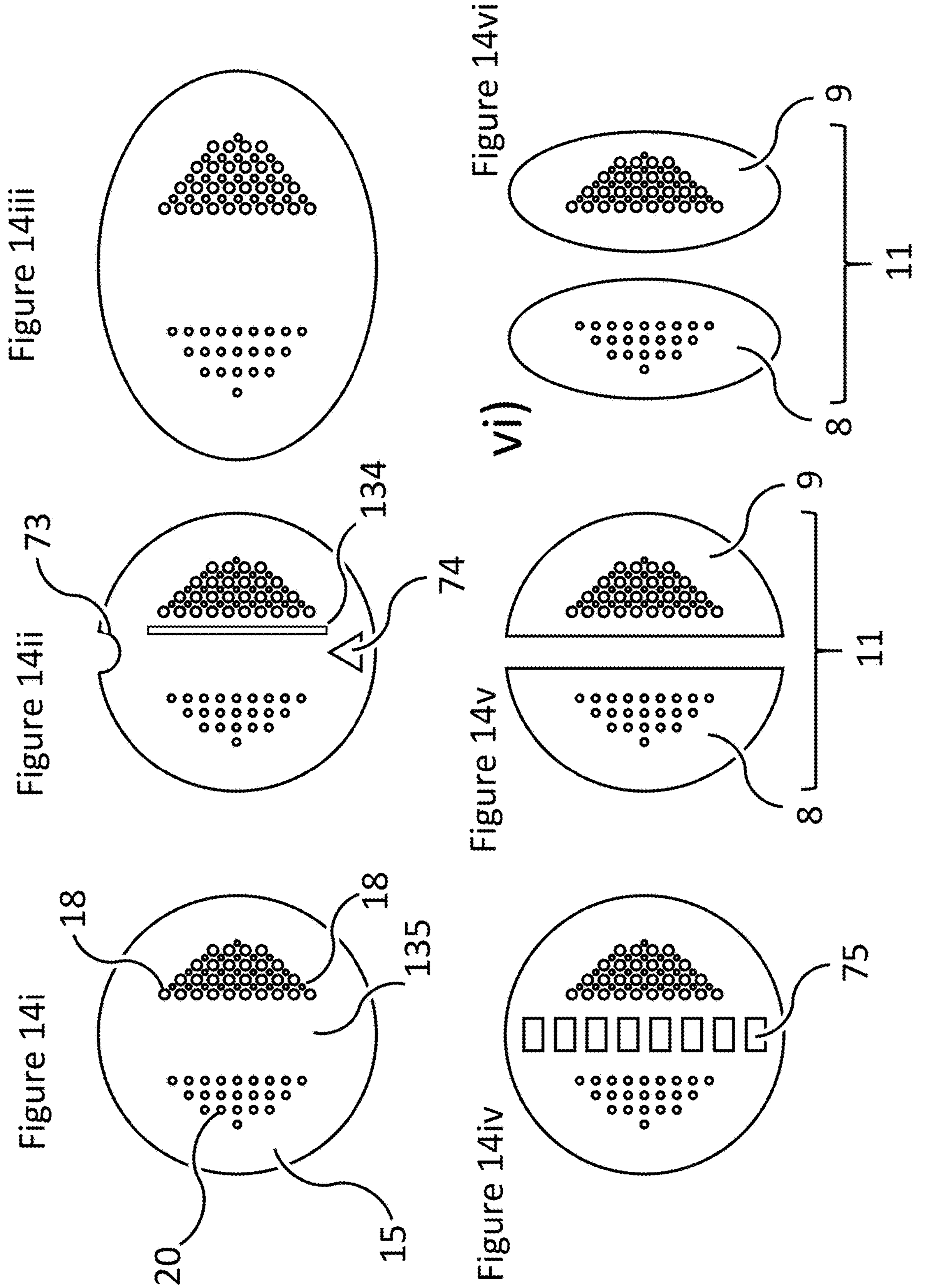
FIGS. 14*i*, 14*ii*, 14*iii*, 14*iv*, 14*v*, and 14*vi* show examples of valves.

FIGS. 14*i-vi* show different configurations of inlet 8 and outlet 9 valves that allow full-wave pressure rectification and that further reduce the risk of glue ingress into the valve, by either aiding with the rotational alignment of the valve, increasing the amount of clearance between the valve holes and the glue bead, by providing exit paths for the glue bead along the sealing diameter 123, or by removing the need for a sealing diameter 123 altogether. These are:

i. The preferred arrangement of a split valve 11, with a circular valve body and the position of the sealing holes 20, the open holes 18, and the release holes 19 on the lower valve panel 15 optimised to minimise glue ingress via the formation of a hole-free adhesion portion 135;
ii. An extension to the preferred arrangement that makes use of one or more of the following:
    a. A keying feature 73, comprising a region that has been fully etched or otherwise removed from the valve structure, which mates with a similar feature in the valve recess 120 of the pump bodies, providing a secondary datum and ensuring rotational alignment on the plane of the recess 120;
    b. Visual marking features 74, provided by partial etching, full etching, laser marking, screen printing, coating application, or otherwise, of the upper 13 or lower 15 plate of the valve 11 to aid with camera processes in the alignment process during pump assembly;
    c. A glue barrier feature 134, as shown in FIG. 13, applied to all or some of the valve structure to prevent the flow of glue close to the lower plate holes;

iii. A split valve 11 with an elliptical or rectangular valve body, breaking the rotational symmetry of the valve and increasing the distance between the lower plate 15 holes and the sealing diameter 123. This both increases the distance between the lower plate 15 holes and the glue bead, and in conjunction with an elliptical valve recess 120 will fix the rotational alignment of the valve with respect to the sealing diameter 123;

iv. A split valve 11 with apertures 75 through the entire valve, allowing the glue bead to flow upwards when the valve is placed and hence reducing the spread of the bead from the sealing annulus 122 and the sealing diameter 123 towards the lower plate 15 holes;

v. A distinct inlet valve 8 and a distinct outlet valve 9, designed to allow for the close integration during pump assembly of both valves into either one common valve recess 120 or two spatially close valve recesses 120. These valves may be the same valve, placed with differing rectification orientations, or two different valves. This particular arrangement also breaks the symmetry of the circular valve, improving the rotational alignment of the valve.

vi. A distinct inlet valve 8 and a distinct outlet valve 9, designed to maximise the area available for gas flow via the lower plate 15 and upper plate 13 holes. The arrangement in FIG. 14*vi* shows two sub-valves with elliptical profile. Alternative valve shapes include circular, rectangular, or polyhedral valve profiles.

Combinations of split valves 11, inlet valves 8, and outlet valves 9 may be combined into a single acoustic cavity; such a combination may allow the pump to rectify the pressure wave near many different antinodes and thereby make use of the full pressure distribution available in the pump.

Whilst the split valve 11 arrangements disclosed in FIGS. 14*i*-14*vi* above show a partition between the inlet and the outlet occurring down the centre line of the valve, other partitioning schemes are possible. One skilled in the art will realise that the more general class of split valves 11, containing a general inlet portion 8 held distinct from a general outlet portion 9, is also possible. These regions may, in general, be of any shape, or be concentric, or be interspersed amongst one another, and may be embedded in a valve which is, itself, any appropriate two-dimensional shape. The crucial steps are the separation of the inlet 8 and the outlet 9 regions by a gas-impermeable barrier, the placement of the inlet and the outlet regions close to the pressure antinodes (or, at least, far from the pressure nodes), and the use of appropriate gas-impermeable manifolding that differentiates between the inlet and outlet ports of a cavity. The valves shown in FIGS. 14*i*-*vi* can increase the ease of manufacture, by reducing the risk of glue flow into the valve Mouldings will now be discussed.

Figure 15:
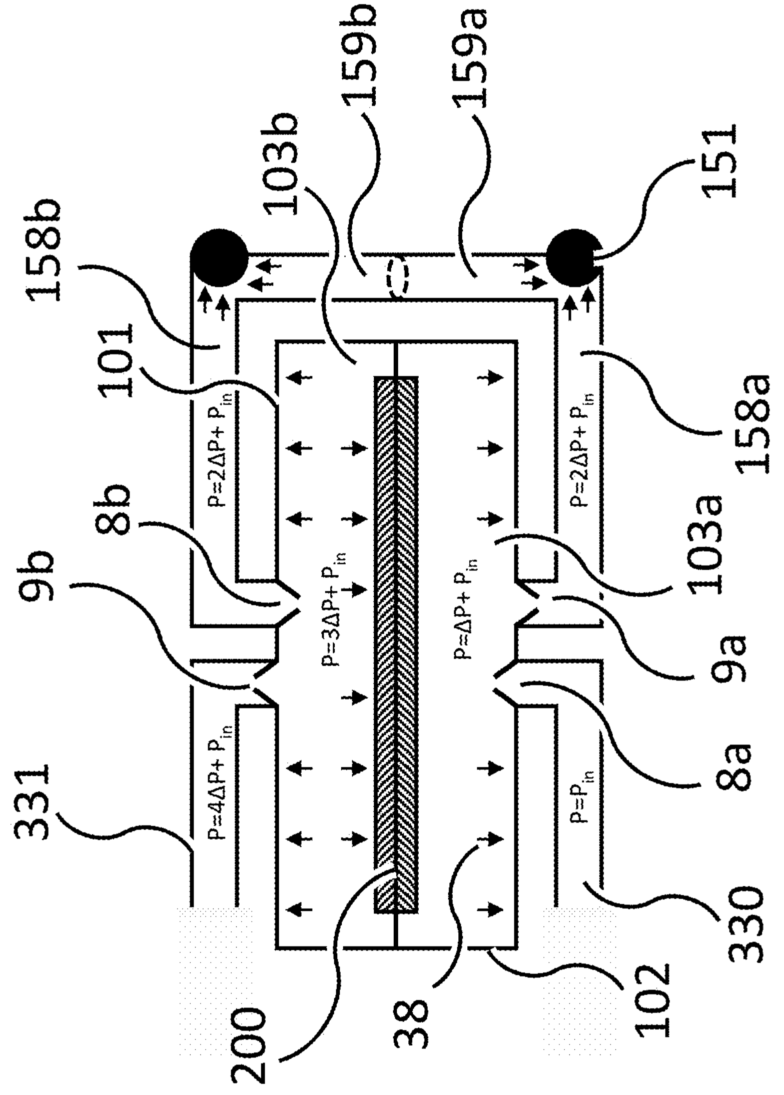
FIG. 15 shows the forces induced on the pump body by the DC pressure in the pump, and the potential leak paths that may subsequently arise.

Each rectification of the pressure wave increases the DC pressure downstream of the valve by an amount ΔP. FIG. 15 shows the DC pressure at various locations in the double-cavity full-wave-rectifying pump arrangements shown previously in FIGS. 6 and 9:

Before the first valve, in the pump inlet 330, $P=P_{in}$;

After the inlet portion 8*a* of the split valve, in the lower acoustic cavity 103*a*, $P=\Delta P+P_{in}$;

After the outlet portion 9*a* of the split valve, in the manifolding comprising the radial bores 158*a* and 158*b*, and the axial bores 159*a* and 159*b*, $P=2\Delta P+P_{in}$;

After the inlet portion 8*b* of the split valve, in the upper acoustic cavity 103*b*, $P=3\Delta P+P_{in}$;

After the outlet portion 9*b* of the split valve, in the pump outlet 331, $P=4\Delta P+P_{in}$.

These DC pressures exert net forces 38 on the lower pump body 102, the manifolding, the nitrile balls 151, the upper pump body 101, and across the actuator 200. Should these net forces overcome the strength of the pump assembly, leaks will develop from one or both cavities to the outside environment. These leaks will tend to reduce the overall performance of the pump by reducing the DC pressure supported in each cavity.

The net forces also act across the actuator 200. To ensure good mode-matching between the actuator spatial mode and the cavity pressure fundamental mode, this actuator is suspended within the pump via an isolator 220. The whole actuator assembly 200, comprising a piezoelectric layer 201, a substrate layer 202, and the isolator 220 can therefore be deflected into the lower pump body 102 due to the net force across it. This undesirable deflection can fatigue the isolator due to the combined action of both the mean stress from the net pressure force and the alternating stress caused by the oscillation of the actuator during pump operation. If this fatigue is too severe, the isolator can undergo structural failure and develop cracks, holes, or tears. As the isolator, as shown in the arrangement of FIG. 6, forms a pneumatic seal between the cavity in the upper pump body 101 and the cavity in the lower pump body 102, its structural failure will therefore result in a leak between the cavities, bypassing two of the valves and reducing the total pneumatic output of the pump to $2\Delta P+P_{in}$.

Figure 16I:
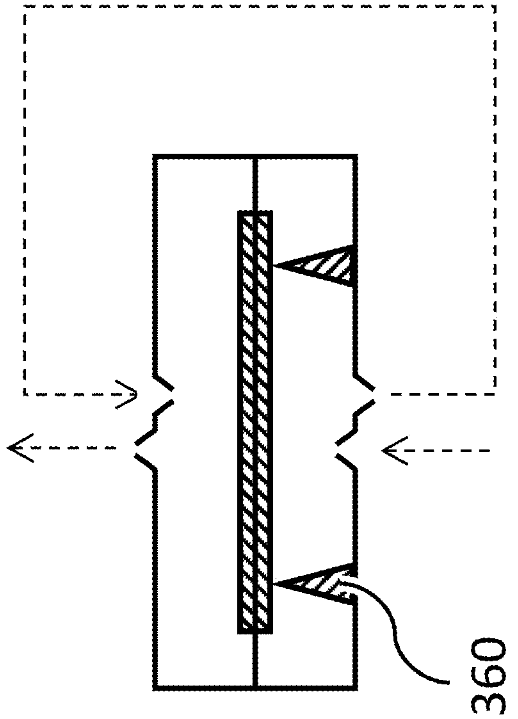
FIGS. 16*i*, 16*ii*, 16*iii*, and 16*iv* show different examples of cavity designs that offset the deflection of an actuator mounted on an isolator, where the deflection is induced by the DC pressure gradient between the two cavities in the pump.
Figure 16I:
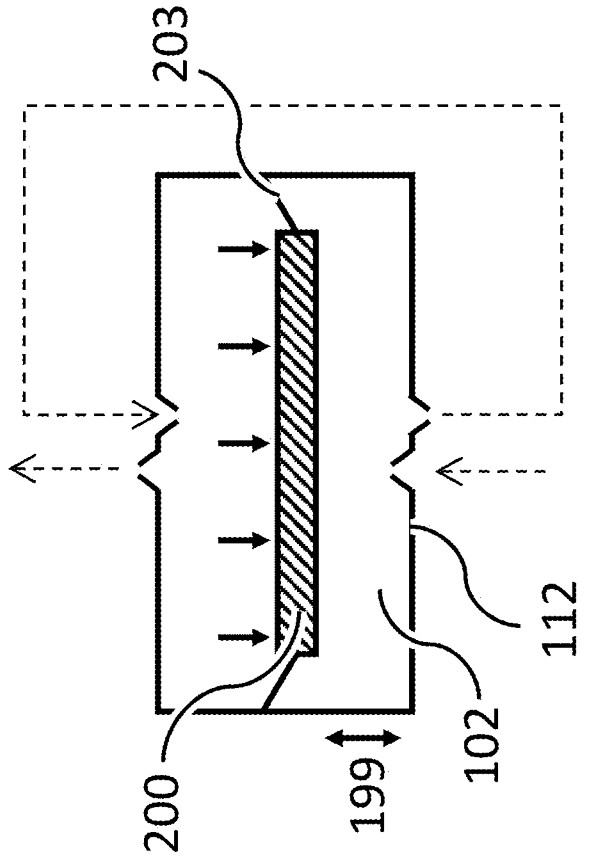
Figure 16I:
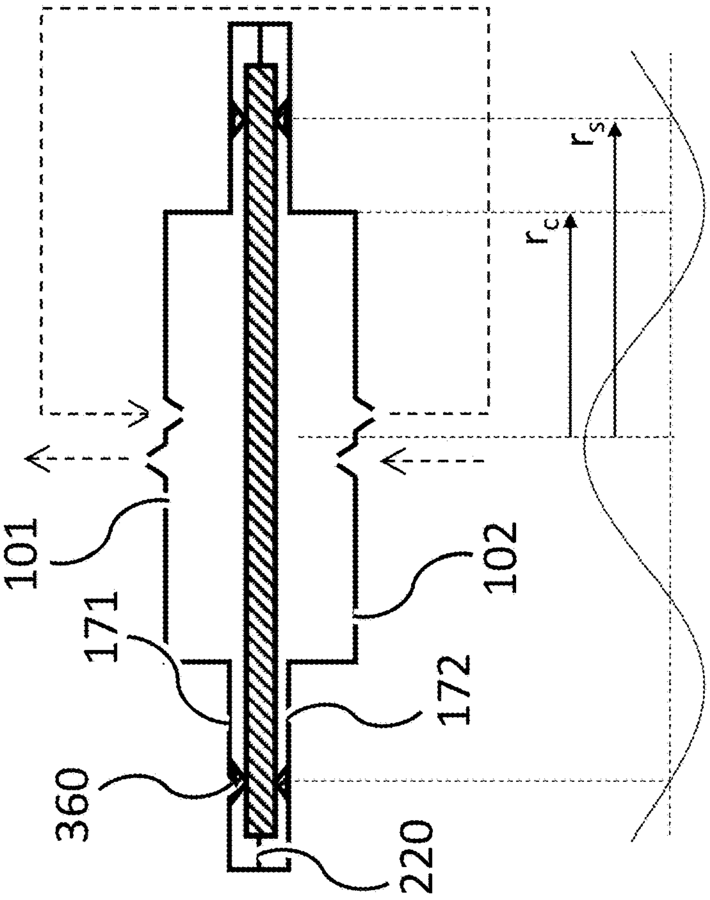
Figure 16I:
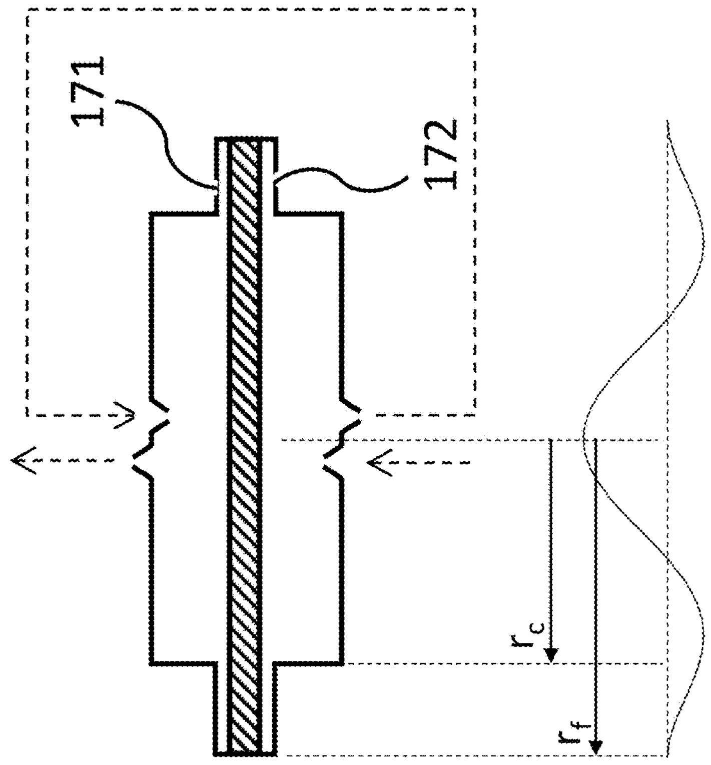

FIGS. 16*i*-*vi* show pump designs that reduce the unwanted effects of the force across the actuator 200. They are:

i. Increasing the depth 199 of the lower pump body 102 by the expected deflection distance to prevent clashing between the actuator 200 and the cavity end wall 112 and to tune the upper and lower cavities such that their resonant frequencies are adjusted to allow for the expected distortion;

ii. Adding support structures 360 to the lower pump body 102 or the actuator 200 that support the actuator 200 precisely at the nodes of its oscillation, preventing deflection and flexi strain in the isolator 220 due to the DC pressure whilst still allowing the actuator to pivot and oscillate. Such support structures may be integral moulded features, moulded inserts, features or mouldings supported by springs or other flexible supports to ensure good contact between actuator and feature, features supported by fine screw threads to allow the fine tuning of distance between the actuator and the feature; or be features that are fastened to either the piezoelectric layer 201 or substrate layer 202 by adhesive, solder, welding, or screws; or be features that have been grown, etched, or otherwise form an integral part of or from one or more parts of the actuator assembly 200. Furthermore, these support structures may offer point support, or continuous support, or any combination therein;

iii. Adding support structures 360 to the lower pump body 102 and the upper pump body 101 that support the actuator 200 precisely at the nodes of its oscillation when operating the actuator 200 at a higher order mode. Such support structures may be integral moulded features, moulded inserts, features or mouldings supported by springs or other flexible supports to ensure good contact between actuator and feature, features supported by fine screw threads to allow the fine tuning of distance between the actuator and the feature; or be features that are fastened to either the piezoelectric layer 201 or substrate layer 202 by adhesive, solder, welding, or screws; or be features that have been grown, etched, or otherwise form an integral part of or from one or more parts of the actuator assembly 200. Furthermore, these support structures may offer point support, or continuous support, or any combination therein; if the support structure is continuous, then it may additionally provide a pneumatic seal between the upper pump body 101 and lower pump body 102. In this configuration, an effective simple support boundary condition is formed at the inserts 360, despite the fact that the actuator itself is supported by the isolator 220. Furthermore, in the arrangement shown in FIG. 16*iii* the actuator is driven to oscillate at a second order or higher radial mode and the radius of support $r_s$ is greater than the radius of the cavity $r_c$. The actuator is free to move due to an undercut in the upper pump body 171 and an undercut in the lower pump body 172; this configuration increases the mode matching between the cavity and the actuator and hence improves the pneumatic performance of the pump.

iv. Removing the isolator 220 and clamping the actuator between the upper 101 and lower 102 pump bodies. In this configuration, the actuator is held with a fixed boundary condition at its edge. Furthermore, in the arrangement shown in FIG. 16*iv* the actuator is driven to oscillate at a second order or higher radial mode and the radius of fixing $r_f$ is greater than the radius of the cavity $r_c$, increasing the mode matching between the cavity and the actuator and hence improving the pneumatic performance of the pump. The actuator is free to move due to an undercut in the upper pump body 171 and an undercut in the lower pump body 172.

Isolators, including resilient isolators, will now be discussed.

As discussed above, the mean stresses and the alternating stresses applied to the isolator during operation can lead to its fatigue and, ultimately, to pneumatic or electrical failure. Whilst the arrangements shown in FIGS. 16*i-vi* offer solutions to the problem, design compromises to reduce this fatigue can also be present. For example, the support structures 360 shown in FIG. 16*ii* may disrupt the good operation of the pneumatic cavities within the pump, reducing the pneumatic output of the device. Therefore, as the root issue is isolator fatigue, it is desirable that the isolator itself should be made resilient to fatigue. Such an isolator will be referred to herein as a “resilient isolator”.

An isolator, resilient or otherwise, should fulfil the following characteristics:

1. It should allow the actuator assembly to oscillate when a drive voltage is applied to the actuator electrodes, and this oscillation should not be significantly damped by the isolator;
2. It should allow the actuator assembly to oscillate with a mode shape similar to the mode shape of a free actuator;
3. It should effectively shield the pump body from transmitted vibrations from the actuator assembly;
4. When used in a double-cavity pump as shown in FIG. 6, it should provide effective pneumatic isolation between the cavity in the lower pump body 102 and the cavity in the upper pump body 101. When used in a single-cavity pump, it should instead provide effective pneumatic isolation between the cavity and the surrounding environment.

Characteristics 1-4 ensure the good operation of a split valve pump for a given isolator design. If they are not achieved—i.e. if the flexural rigidity of the isolator is comparable to the rigidity of the actuator—then the pneumatic performance of the pump will be reduced.

In addition to the above, a resilient isolator can fulfil the following ancillary characteristics:

5. It should be resilient to the mean stress caused by the cross-actuator DC pressure;
6. It should be resilient to the alternating stress caused by the actuator oscillating during operation;
7. It should be resilient to the combination of alternating and mean stress caused by the actuator oscillating whilst also being distorted by the cross-actuator DC pressure in the pump.

It is commercially desirable that the pump should operate with good pneumatic performance for a period of hours, days, or years within products depending on the demands of the application. As the pump operates at ultrasonic frequencies, these characteristics mean that a resilient isolator should be capable of good operation for a minimum of $10^7$ cycles, preferably for more than $10^{10}$ cycles and ideally for more than $10^{13}$ cycles. In the following, N is defined as the number of pump cycles during the lifetime of the design. When $N<10^7$, the fatigue properties of many materials are still evolving; this period of product lifetime is defined herein as the “low-N” regime. Conversely, when $N>10^{10}$ the fatigue properties are generally dominated by material inclusions, pores, or other microscale defects; this period of product lifetime is defined herein as the “high-N” regime.

Figure 17:
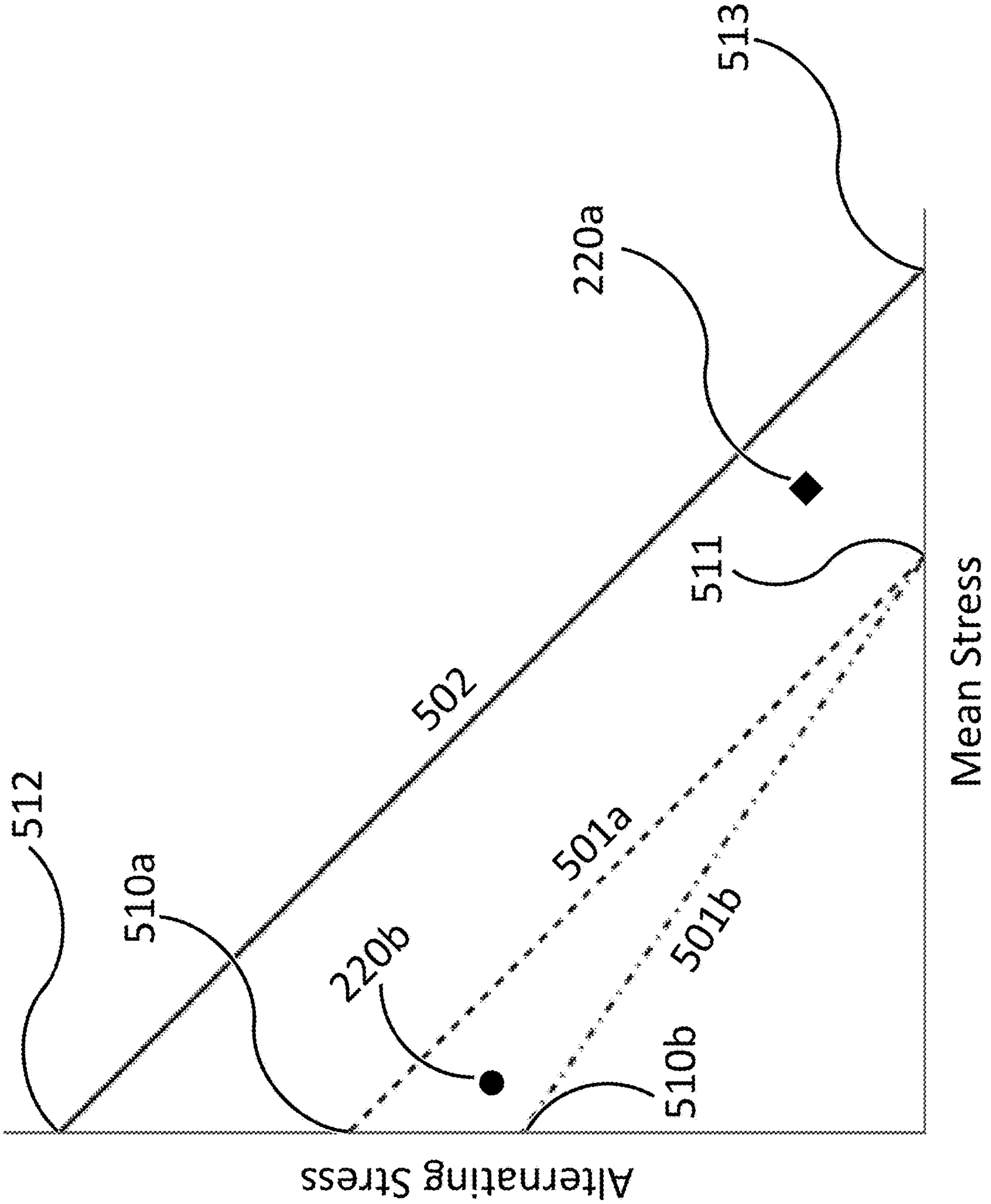
FIG. 17 shows the variation of the equivalent fatigue limit of two nominal materials with mean stress, and demonstrates how the combination of both mean and alternating stresses sets design specifications for resilient isolators.

FIG. 17 shows a Haigh plot of the equivalent fatigue limit for two candidate materials for use in a resilient isolator, represented by their characteristic Goodman lines. The first material represents many common engineering materials which could be used in an isolator, such as aluminium, various nickel and magnesium alloys, and copper. The Goodman line for the first material in the low-N regime, 501*a*, connects the endurance limit at low-N, 510*a*, to the ultimate tensile strength of the material 511. As the number of actuator cycles increases, the endurance limit decreases to the endurance limit at high-N 510*b* for this class of material so that the Goodman line for the first material in the high-N regime, 501*b*, lies lower than the line for the low-N regime 501*a*. There is therefore a reduction in material strength during operation for isolators constructed using the first material. The second material represents a second class of materials which could also be used in an isolator, such as steel, beryllium copper, Inconel alloys, and cupro-nickel alloys. These materials do not typically reduce in strength during operation for $N>10^7$, so offer a stable design option for resilient isolators. The Goodman line for the second material, 502, is therefore the same for both the low-N and high-N regimes. Furthermore, the endurance limit 512 and yield strength 513 of this class of materials are typically superior to those of the first class of materials, so that the Goodman line for the second material 502 lies above both lines for the first material, 501*a* and 501*b*.

An isolator design will tend to experience a certain degree of alternating stress and mean stress depending on its construction, drive conditions, and environment within the pump. A given isolator design can therefore be represented as a point within the Haigh plot shown in FIG. 17. If this point lies within the triangular region defined by the mean stress axis, the alternating stress axis, and the Goodman line for a given material at N cycles, the design is expected to survive that many cycles of operation; this is defined herein as the “safe area” for a given material.

Two such illustrative isolator designs are plotted on FIG. 17. The first isolator design 220*a*, shown by the diamond, is an example of a design which experiences high mean stress and low alternating stress during operation. Such a design lies within the safe area for the second material and outside the safe area for the first material, irrespective of the number of cycles. It is therefore expected to survive when constructed from the second material but is not expected to survive when constructed from the first material. The second isolator design 220*b*, shown by the filled dot, is an example of a design which experiences low mean stress and high alternating stress during operation. Such a design lies within the safe area for the second material and as such is expected to survive when constructed from the second material. However, as it lies inside the safe zone for the first material in the low-N regime and outside the safe zone for the first material in the high-N regime, the second isolator design 200*b* will not survive to the high-N regime if constructed from the first material.

An isolator design can therefore balance the demands of the alternating and mean stresses experienced by each element within the isolator. An isolator design which offers minimal support to the actuator will experience very little alternating stress during operation but will be significantly distorted by mean stress during operation and is therefore at increased risk of damage. Conversely, an isolator design which seeks to overcome the mean stress through rigid support of the actuator will either experience large alternating stresses or will reduce the oscillation amplitude of the actuator contrary to characteristics 1-2 above. Furthermore, if an unfavourable material is chosen for construction, the safe zone for the design can shrink during operation and designs may not be viable for longer lifetime applications.

The peak stresses experienced by an isolator can be further increased due to defects formed during actuator or pump assembly. For illustration and without loss of generality, consider the arrangement shown in FIGS. 6 and 9. Here, the piezoelectric layer 201 and aluminium layer 202 are bonded on either side of the isolator 220 with adhesive; further, the combined actuator-isolator structure is bonded between the lower pump body 102 and upper pump body 101 with adhesive. These adhesive bonds typically form sharp fillets which significantly increase stresses nearby within the isolator, increasing the likelihood of isolator failure at these points. Other such stress-raising defects include isolator deformation due to global or local warping of the lower pump body and/or the upper pump body, concentricity errors between the actuator 200 and the pump cavity in the lower pump body 102 and/or the upper pump body 101, or bowing of the actuator body due to a mismatch in the coefficient of thermal expansion between the piezoelectric and substrate layers.

Characteristics 1-7 mean that many simple isolator design choices represent an undesirable trade-off between resilience and pump performance. For example:

- Using an isolator material with a large Young's modulus or large thickness will reduce the mean stresses experienced by the isolator but will suppress the oscillation amplitude of the actuator, reducing the pneumatic performance of the pump;
- Reducing the isolator span will reduce the mean stresses experienced by the isolator but will cause the isolator to impart a greater bending moment to the edge of the actuator, reducing mode-matching between actuator and cavity and hence reducing the pneumatic performance of the pump.

Resilient isolators constructed from layers of laminated materials can avoid these issues. Designs using laminate construction allow the effective flexural rigidity of the composite to be finely controlled through material choice, layer thickness, and layer position within the laminar stack, maintaining good isolator performance. Furthermore, laminates can incorporate materials with superior fatigue resilience (such as those represented by the Goodman line 502 in FIG. 17), and can exploit the layered structure to position vulnerable layers near to the neutral plane of the laminate, shielding these layers from high peak stresses.

- These layers can be formed from plastics such as polyimide or PET; adhesives or other soft or semi-soft materials; electrically-conductive metals such as copper, silver, or gold; suspensions of electrically-conductive materials encapsulated within epoxy or adhesive; structural metals such as steel, titanium, or aluminium; alloys with superior fatigue resilience such as Inconel, copper-nickel alloys, or beryllium-copper alloys; MEMS materials such as PDMS, silicone wafers, or metal-oxides; or resilient woven materials such as aramid polymers.
- If one or more elastically compliant layers form some or all of the outermost layer of the resilient isolator, these layers may be used to form an effective pneumatic seal between the upper and lower pump bodies. These layers may be formed from soft plastics, adhesives, silicone, rubber, nitrile rubber, or closed-cell foams, and may be affixed to the isolator using adhesives or otherwise.
- The layers can span the full region between the actuator and the pump body, or be selectively patterned, etched, thickened, thinned, or coated to allow for fine control of the flexural rigidity of the isolator locally as well as globally. Materials with favourable fatigue properties may have Young's moduli which would be overly large, increasing the flexural rigidity of the isolator and hence violating Characteristic 1. By patterning these materials to reduce their coverage, this issue can be avoided and the materials can therefore be incorporated in the design.
- Patterning can comprise circular sections, arcs, rectangles, squares, diamonds, and other regular or irregular polygons with or without sharp or circular corners, and the patterning may be regular or repeated with respect to some, none, or all of the radial direction, the azimuthal direction, or the axial direction.
- One or more electrically conductive layers, patterned or otherwise, may be used as part of the construction. Each electrically conductive layer may be used to provide electrical contact to one or more actuator electrodes. The electrical conductivity of a layer may be enhanced through the addition (through sputtering, coating, casting, or otherwise) of thin films of electrically conductive materials applied directly onto the surface of said layer. For example, a film of copper, gold, or silver may be deposited onto the surface of a steel or Inconel layer in order to increase the total conductivity of the layer without significantly affecting the elastic or fatigue-resistant properties of the layer.

Figure 19I:
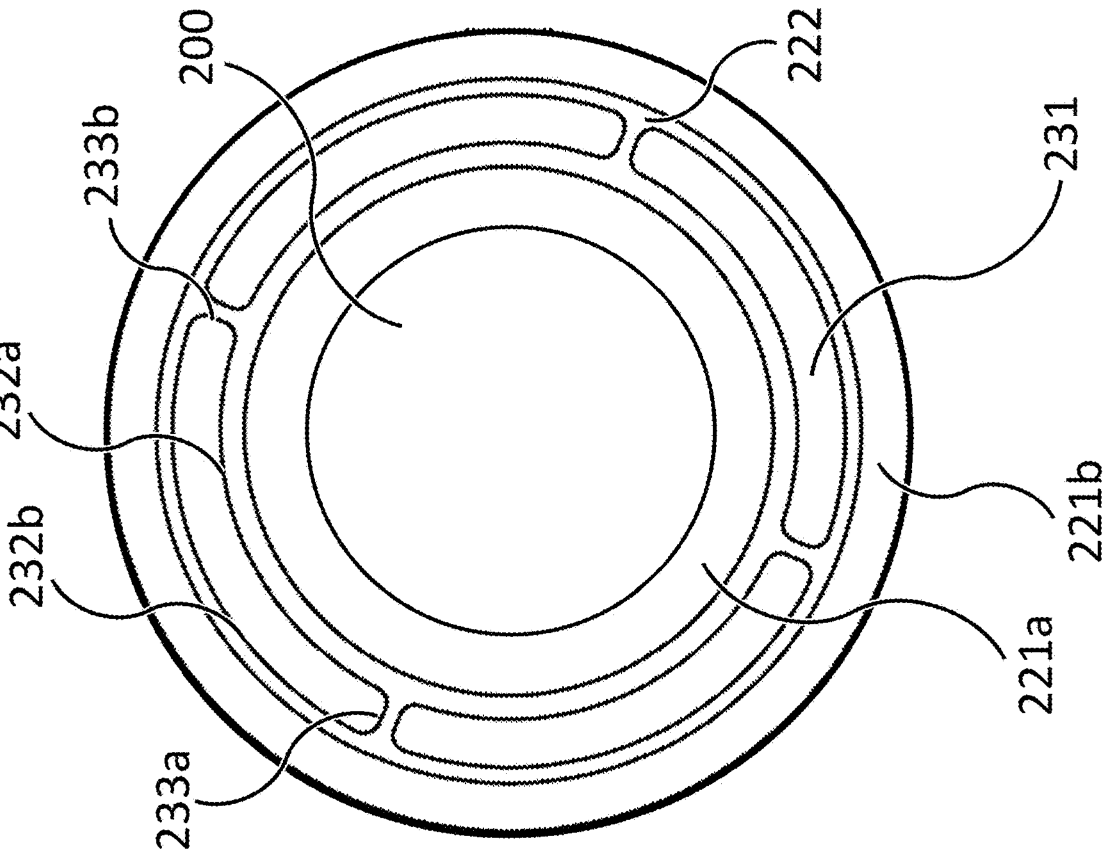
FIGS. 19*i* and 19*ii* show plan views of two embodiments of a three-region resilient isolator, highlighting patterning geometries that may be used to reduce the flexural rigidity in the flexible region.
Figure 19I:
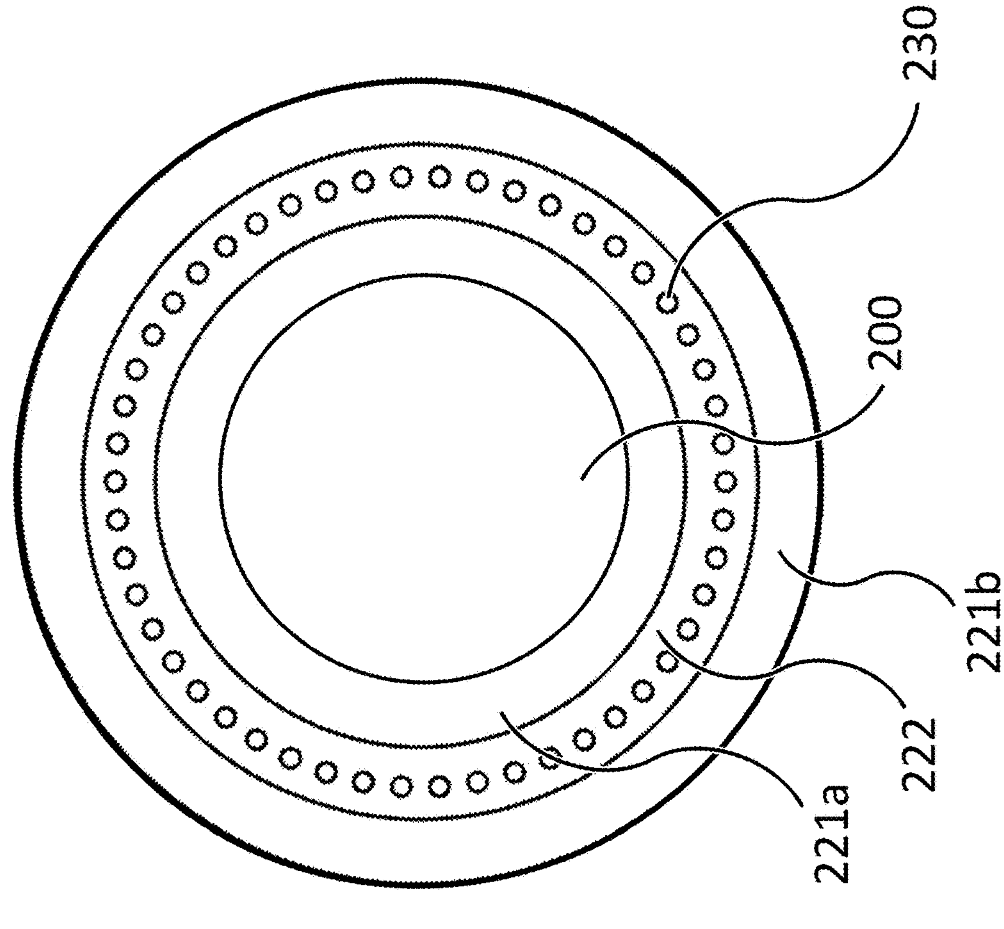
Figure 20:
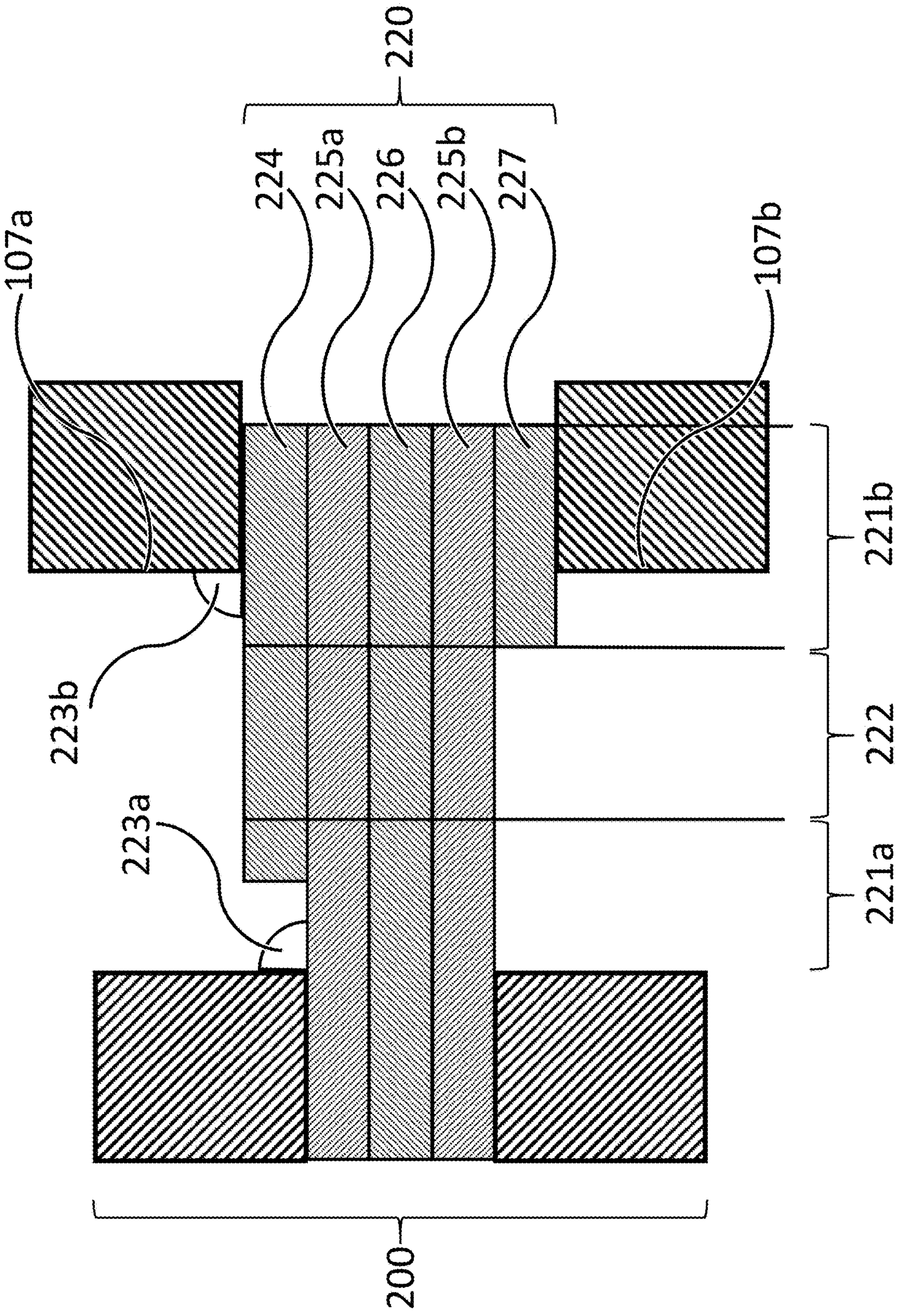
FIG. 20 shows a side-on view of a resilient isolator, comprising three distinct regions two robust regions, and one flexible region.

Specific embodiments of resilient isolators that utilise a combination of laminar structure and suitable patterning are shown in FIGS. 19 and 20.

Figure 18:
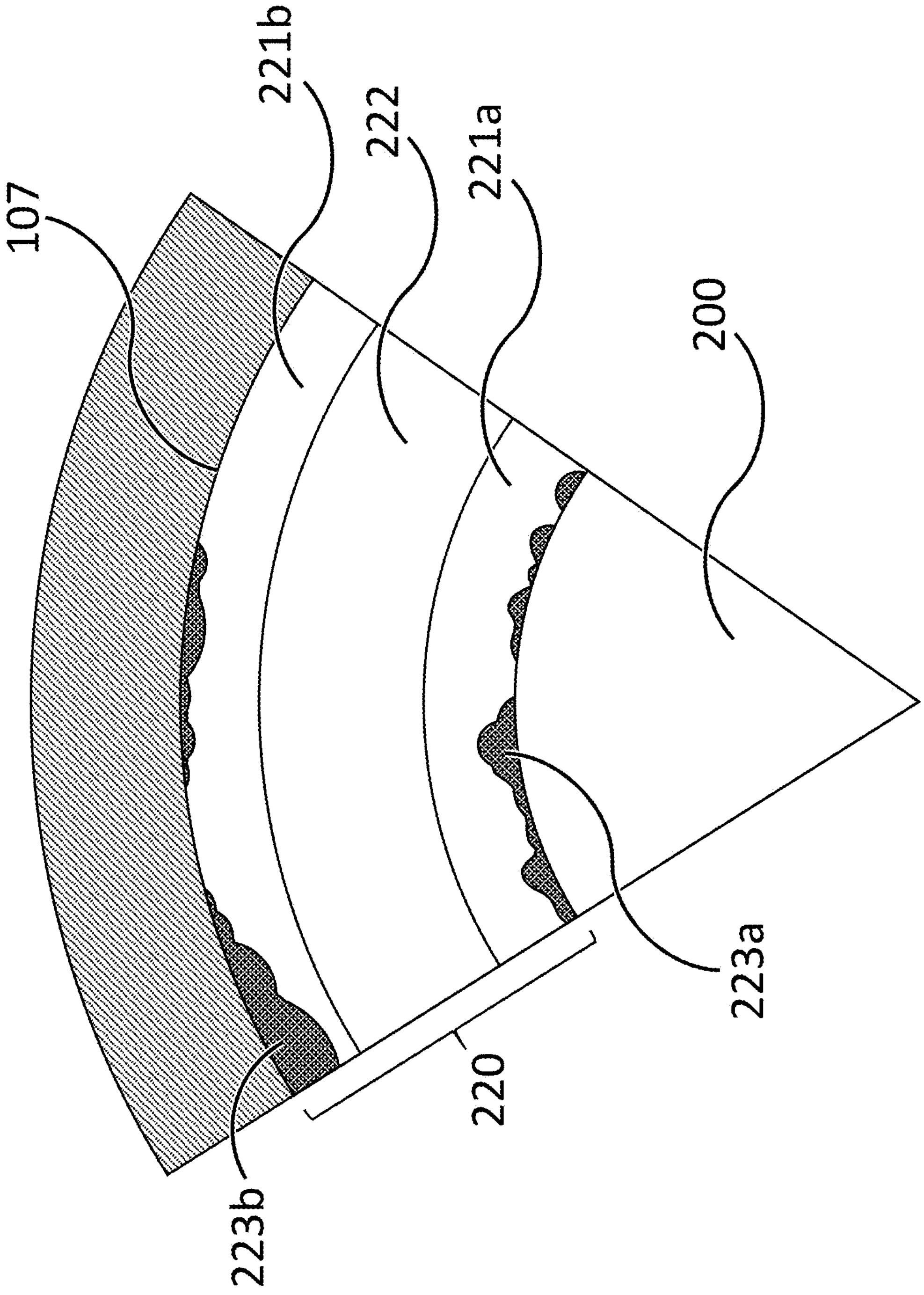
FIG. 18 shows a plan view of a resilient isolator, comprising three distinct regions—two robust regions, and one flexible region.

FIG. 18 shows a plan view of a resilient isolator designed to combat the isolator stress raisers associated with unwanted adhesive fillets that may form during construction. The isolator 220 is divided into three regions: a first robust region 221*a*, a first flexible region 222, and a second robust region 221*b*. During construction, adhesive fillets 223*a*, 223*b* may encroach onto the surface of the isolator 220; these typically arise from the construction of the actuator 200, forming a first adhesive fillet 223*a*; or from the construction of the pump via the cavity side wall 107, forming a second adhesive fillet 223*b*. The robust regions 221*a* and 221*b* are designed such that the resilience of the isolator in these regions is maximised, with flexibility of secondary concern. Conversely, the first flexible region 222 is designed such that the flexibility of the isolator is maximised within this region, with isolator resilience of secondary concern. The diameter of interface between the first robust region 221*a* and the first flexible region 222 is larger than the diameter of the first adhesive fillet 223*a*, and the diameter of interface between the second robust region 221*b* and the first flexible region 222 is smaller than the diameter of the second adhesive fillet 223*b*, such that both adhesive fillets 223*a* and 223*b* are fully contained within the first robust region 221*a* and the second robust region 221*b* respectively.

The robust regions 221*a* and 221*b* may be formed using any of the materials discussed above, in isolation or as part of a laminar stack, and may be patterned, etched, or have protective layers or coatings applied to them in order to enhance their resilience. The laminar layers may be bonded with adhesive or joined adhesivelessly by processes including sputter-coating, casting, or otherwise. Combinations of bonding methods may be used for the adhesion of different layers within the laminar stack.

If the isolator is used to provide electrical contact between the drive and the actuator 200, then one or both of the upper and/or lower layers of the robust region 221*a* should be electrically conductive so as to make good contact with the actuator electrode or electrodes.

Additional layers may be added to the robust regions 221*a* and 221*b* through the use of adhesives, or may be formed via material growth, deposition, or sputter coating. Furthermore, these layers may be of comparable thickness to the actuator 200, such that to first approximation all the flexural motion of the isolator takes place within the flexible region 222.

The flexible region 222 may also be formed from any of the materials discussed above, in isolation or as part of a laminar stack, and may be patterned, part-etched, or have layers or coatings selectively removed so as to reduce the flexural rigidity of the region in comparison to the robust regions 221*a* and 221*b*. The laminar layers may be bonded with adhesive or joined adhesivelessly by processes including sputter-coating, casting, or otherwise. Combinations of bonding methods may be used for the adhesion of different layers within the laminar stack.

In a preferred embodiment, the robust region 221*a* is formed from a stack of at least three layers—at least two layers of gold-plated copper, cupronickel, beryllium-copper, or Inconel alloy, of any thickness but preferably between 5 microns and 500 microns; and a single layer of polyimide of any thickness but preferably between 5 microns and 500 microns. The robust region 221*b* is formed from a stack of at least four layers—one or more protective layers formed from polyimide, acrylic, or steel, of any thickness but preferably between 5 microns and 1000 microns; at least two layers of gold-plated copper, cupronickel, beryllium-copper, or Inconel alloy, of any thickness but preferably between 5 microns and 500 microns; and one layer of polyimide of any thickness but preferably between 5 microns and 500 microns. The flexible region 222 is formed from a stack of at least three layers—at least two layers of gold-plated copper, cupronickel, beryllium-copper, or Inconel alloy of any thickness but preferably between 5 microns and 500 microns; and a single layer of polyimide of any thickness but preferably between 5 microns and 500 microns. Furthermore, the flexible region 222 may have material removed from one or more of the layers in order to reduce the flexural rigidity therein. The diameter of interface between the first robust region 221*a* and the first flexible region 222 is between 18 millimetres and 21 millimetres, and the diameter of interface between the second robust region 221*b* and the first flexible region 222 is between 19 millimetres and 24 millimetres. The first robust region 221*a* and the second robust region 221*b* are distinct and separated by the first flexible region 222, and the width of the flexible region is greater than 0.1 millimetres. Additional layers 224 may be added to one, some, or none of the first robust region 221*a*, the first flexible region 222, and the second robust region 221*b*, an example of which is shown in FIG. 20.

The flexible region 222 of the preferred embodiment may be patterned by the removal of material in one or more layers in a regular azimuthal arrangement such that the final pattern is comprised of a number of similar or identical unit cells circumferentially arranged around the central actuator 200. These unit cells may comprise, in isolation or in combination, circles, round-cornered rectangles, regular polygons, round-cornered regular polygons, irregular polygons, or round-cornered irregular polygons. Two examples of such patterning are shown in FIG. 19*i* and FIG. 19*ii*.

FIG. 19*i* shows a three-region isolator comprising a first robust region 221*a*, a first flexible region 222, and a second robust region 221*b*, surrounding a central actuator 200. The flexible region 222 is patterned by a regular circumferential arrangement of through-etched holes 230 in at least one of the layers of gold-plated copper, cupronickel, beryllium-copper, or Inconel alloy. The through-etched holes 230 have a diameter d of between 0.1 millimetres and 6 millimetres, and a centre to centre hole-hole spacing of between 0.1 d and 10 d such that each hole remains distinct from each other hole. If more than one layer within the flexible region is patterned, the patterning of the layers may be offset radially, azimuthally, or both radially and azimuthally with respect to the patterning of the other layers.

FIG. 19*ii* shows a three-region isolator comprising a first robust region 221*a*, a first flexible region 222, and a second robust region 221*b*, surrounding a central actuator 200. The flexible region 222 is patterned by a regular circumferential arrangement of round-cornered rectangles 231 (or arcuate formations) in at least one of the layers of gold-plated copper, cupronickel, beryllium-copper, or Inconel alloy. Furthermore, the rectangles are curved such that two opposite sides lie on lines of constant radii ("r-sides" 232*a* and 232*b*) and the two remaining sides lie on lines of constant azimuthal angle ("q-sides" 233*a* and 233*b*). R-sides may have lengths between 0.1 mm and 150 mm, while q-sides may have lengths between 0.1 mm and 6 mm. The edge-to-edge spacing between adjacent rectangles may be between 0.1 mm and 100 mm. If more than one layer within the flexible region is patterned, the patterning of the layers may be offset radially, azimuthally, or both radially and azimuthally with respect to the patterning of the other layers.

One, some, or all of the electrically conductive layers of the resilient isolator may make connections to one, some, or all of the electrodes of the piezoelectric layer of the actuator.

FIG. 20 shows a cut-through view of an embodiment of a resilient isolator 220, comprising an upper electrically conductive layer 225*a*, an electrically isolating layer 226, a lower electrically conductive layer 225*b*, a protective layer 227, and an additional layer 224 which will be discussed below. The isolator 220 is divided radially into three regions—a first robust region 221*a*, a first flexible region 222, and a second robust region 221*b*. The increased flexibility of the flexible region 222 may be achieved through the patterning, part-etching, or layer removal of material from any of the layers in the azimuthal direction (not shown). The isolator 220 is affixed on one edge by the cavity side wall (formed from the upper pump body side wall 107*a*, and the lower pump body side wall 107*b*), and on the other edge by the actuator 200. A first isolator glue fillet 223*a* is formed at the intersection between the actuator 200 and the isolator 220, whilst a second isolator glue fillet 223*b* is formed at the intersection between the isolator 220 and the cavity side walls 107*a* and 107*b*. The additional layer, herein referred to as the fail-safe layer 224, spans the entirety of the flexible region 222, and may additionally span none, some, or all of the first robust region 221*a* and the second robust region 221*b*.

The fail-safe layer 224 may be constructed from one or more flexible materials that can readily deform such as plastics, parylene, silicone, nitrile rubber, thin conformal coatings, adhesives, or any combination therein. This layer preserves characteristic 4 for the isolator because, even if the underlying isolator structure becomes damaged, pneumatic isolation between the cavity in the upper pump body 101 and the cavity in the lower pump body 102 is preserved by the deforming fail-safe layer encapsulating the damage. Furthermore, if the fail-safe layer is larger in extent than the cavity in the upper pump body 101 and the cavity in the lower pump body 102, it may be used to prevent gas flow around the isolator between the cavities, increasing the effectiveness of the pneumatic seal.

In one embodiment, the fail-safe layer 224 comprises an annular ring of polyimide bonded to one or more surfaces of the isolator using adhesive of any thickness but preferably between 10 microns and 500 microns, the inner diameter of the annulus is between 17 mm and 22 mm, the outer diameter of the annulus is between 18 mm and 30 mm, and the annulus has a minimum width of 1 millimetre. Furthermore, the entirety of the flexible layer 222, as well as none, some, or all of the first robust layer 221*a* and the second robust layer 221*b* are covered by the fail-safe layer.

In a second embodiment, both the isolator 220 and the actuator 200 are covered with a compliant coating such as parylene to a thickness of between 1 micron and 1 millimetre.

In a third embodiment, the fail-safe layer forms an internal layer of the isolator laminar stack, or one or more fail-safe layers are distributed throughout the isolator laminar stack.

Figure 21:
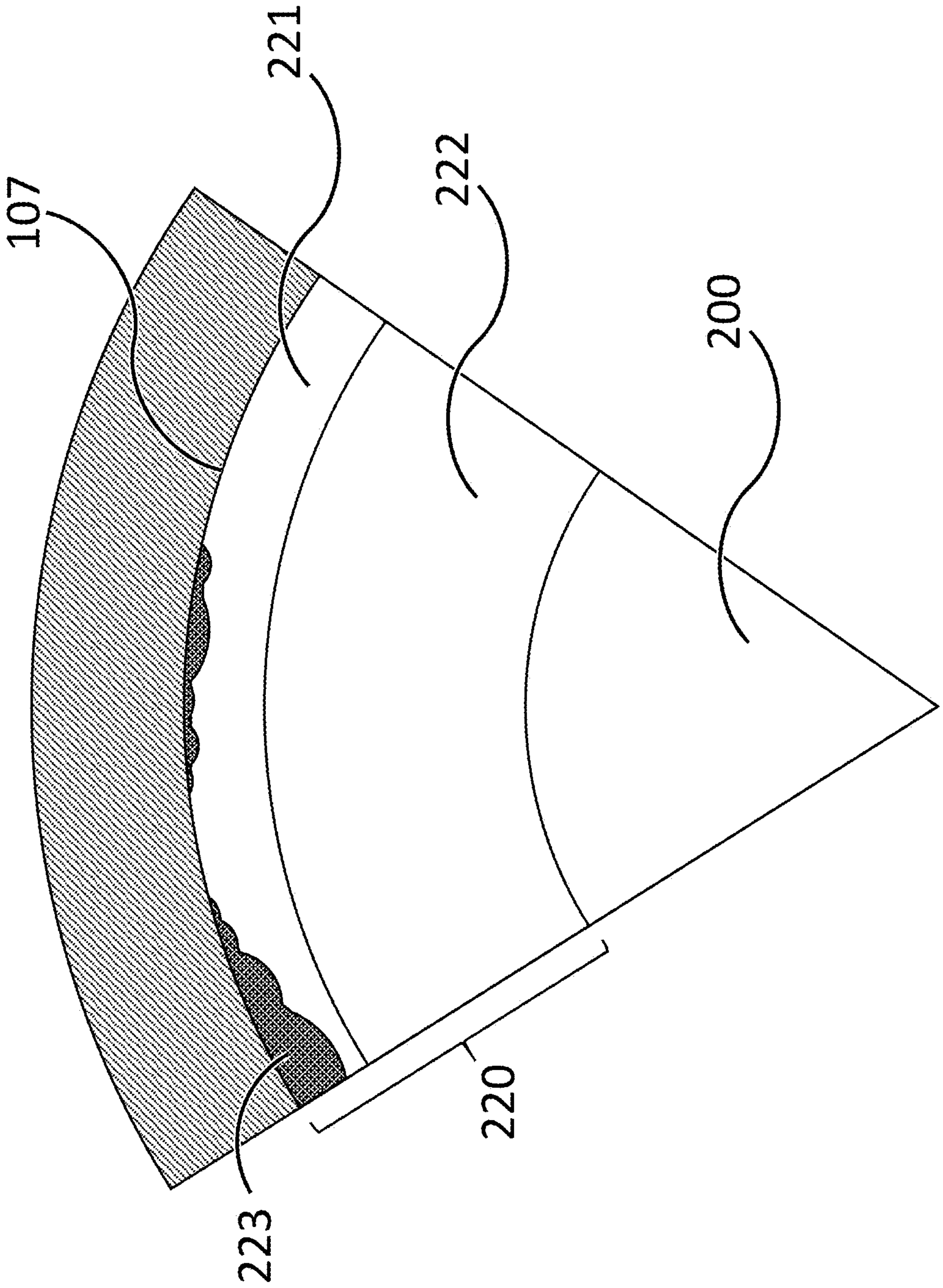
FIG. 21 shows a plan view of a resilient isolator, comprising two distinct regions—one robust region, and one flexible region.

While the embodiments shown in FIGS. 19, 20, and 21 address stress raisers from both the first adhesive fillet 223*a* and second adhesive fillet 223*b*, the presence of both the first robust region 221*a* and the second robust region 221*b* may increase the flexural rigidity of the isolator 220 to a level that is deemed unacceptable for a certain design. In many practical cases, the first adhesive fillet 223*a* may be significantly smaller than the second adhesive fillet 223*b*, in which case the dominant stress raiser will be the second adhesive fillet and therefore the first robust region 221*a* is no longer crucial to the good operation of the isolator. Additionally, actuator assemblies with large first adhesive fillets 223*a* may be removed from a batch by simple visual screening after their construction; the same can not be done for pumps with large second adhesive fillets 223*b*, as there is no viable line of sight to this fillet after assembly.

FIG. 21 shows a plan view of a resilient isolator designed to combat the isolator stress raisers associated with the unwanted second adhesive fillets 223 that may form during pump assembly. The isolator 220 is divided into two regions: a robust region 221, and a flexible region 222. The robust region 221 is designed such that the resilience of the isolator in this region is maximised, with flexibility of secondary concern. Conversely, the flexible region 222 is designed such that the flexibility of the isolator is maximised within this region, with isolator resilience of secondary concern. The diameter of interface between the robust region 221 and the flexible region 222 is smaller than the diameter of the second adhesive fillet 223 such that the adhesive fillet is fully contained within the robust region 221.

The robust region 221 may be formed using any of the materials discussed above, in isolation or as part of a laminar stack, and may be patterned, etched, or have protective layers or coatings applied to them in order to enhance their resilience. The laminar layers may be bonded with adhesive or joined adhesivelessly by processes including sputter-coating, casting, or otherwise. Combinations of bonding methods may be used for the adhesion of different layers within the laminar stack.

Additional layers may be added to the robust region via adhesives, or may be formed via material growth, deposition, or sputter coating. Furthermore, these layers may be of comparable thickness to the actuator 200, such that to first approximation all the flexural motion of the isolator takes place within the flexible region 222.

The flexible region 222 may also be formed from any of the materials discussed above, in isolation or as part of a laminar stack, and may be patterned, part-etched, or have layers or coatings selectively removed so as to reduce the flexural rigidity of the region in comparison to the robust region 221. The laminar layers may be bonded with adhesive or joined adhesivelessly by processes including sputter-coating, casting, or otherwise. Combinations of bonding methods may be used for the adhesion of different layers within the laminar stack.

In a preferred embodiment, the robust region 221 is formed from a stack of at least four layers—one or more protective layers formed from polyimide, acrylic, or steel, of any thickness but preferably between 5 microns and 1000 microns; at least two layers of gold-plated copper, cupronickel, beryllium-copper, or Inconel alloy, of any thickness but preferably between 5 microns and 500 microns; and one layer of polyimide of any thickness but preferably between 5 microns and 500 microns. The flexible region 222 is formed from a stack of at least three layers—at least two layers of gold-plated copper, cupronickel, beryllium-copper, or Inconel alloy of any thickness but preferably between 5 microns and 500 microns; and a single layer of polyimide of any thickness but preferably between 5 microns and 500 microns. Furthermore, the flexible region 222 may have material removed from one or more of the layers in order to reduce the flexural rigidity therein. The diameter of interface between the robust region 221 and the flexible region 222 is between 18 millimetres and 24 millimetres. A fail-safe layer may be added to one, both, or none of the robust region 221 and/or the flexible region 222.

The flexible region 222 of the preferred embodiment may be patterned by the removal of material in one or more layers in a regular azimuthal arrangement such that the final pattern is comprised of a number of similar or identical unit cells circumferentially arranged around the central actuator 200. These unit cells may comprise, in isolation or in combination, circles, round-cornered rectangles (or arcuate formations), regular polygons, round-cornered regular polygons, irregular polygons, or round-cornered irregular polygons. One example of such patterning is shown in FIG. 22.

Figure 22:
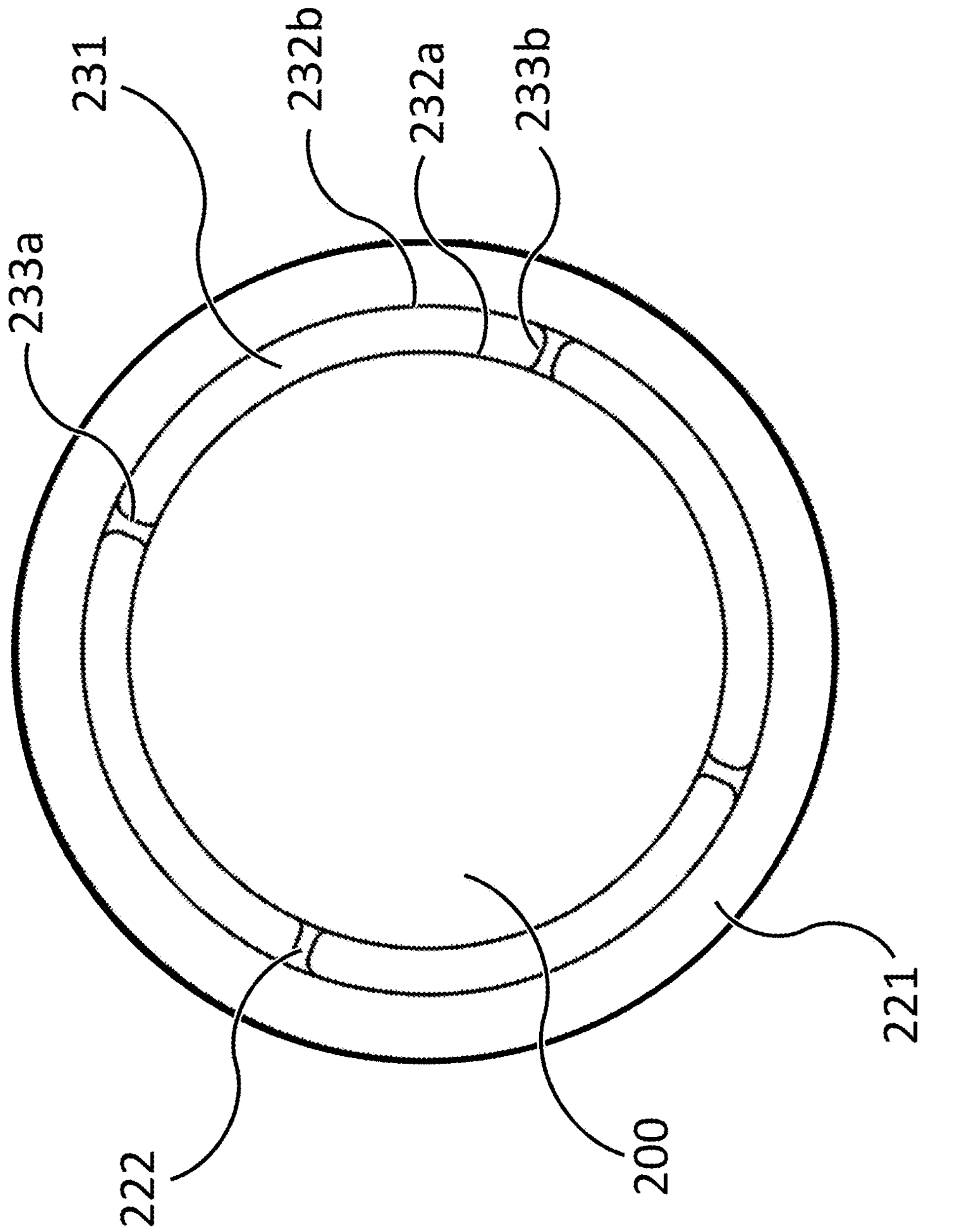
FIG. 22 shows a plan view of a two-region resilient isolator, highlighting a patterning geometry that may be used to reduce the flexural rigidity in the flexible region.

FIG. 22 shows a two-region isolator comprising a flexible region 222 and a robust region 221 surrounding a central actuator 200. The flexible region 222 is patterned by a regular circumferential arrangement of round-cornered rectangles 231 in at least one of the layers of gold-plated copper, cupronickel, beryllium-copper, or Inconel alloy. Furthermore, the rectangles are curved such that the r-sides 232*a* and 232*b* lie on lines of constant radii and the q-sides 233*a* and 233*b* lie on lines of constant azimuthal angle. R-sides may have lengths between 0.1 mm and 150 mm, while q-sides may have lengths between 0.1 mm and 6 mm. The edge-to-edge spacing between adjacent rectangles may be between 0.1 mm and 100 mm. If more than one layer within the flexible region is patterned, the patterning of the layers may be offset radially, azimuthally, or both radially and azimuthally with respect to the patterning of the other layers.

One, some, or all of the electrically conductive layers of the resilient isolator may make connections to one, some, or all of the electrodes of the piezoelectric layer of the actuator.

The axial structure of the robust region 221 and the flexible region 222 may follow the layout outlined for the three-region embodiment discussed above and shown in FIG. 20.

Another resilient isolator will now be described. The isolator comprises two primary functional layers—a first layer, comprising an electrically conductive material, which provides an electrical connection to the piezoelectric layer of the actuator, and a second layer, which supports the first layer and provides a pneumatic seal between the two cavities of the pump. Further layers may be added to the laminar stack to address certain fatigue characteristics; these layers are described below.

It is often the case that the electrically conductive layer is fatigued during pump operation, and that the ultimate failure of the electrically conductive layer triggers the subsequent failure of the support layer, thus leading to the failure of the pneumatic seal between the pump cavities. This design addresses this risk by reducing the fatigue experienced by the electrically conductive layer, with the fatigue experienced by the support layer of secondary concern. For most practical designs, the Young's modulus of the conductive layer is much greater than the Young's modulus of the support layer. Therefore, to first approximation, the neutral plane of the resilient isolator is in the middle of the conductive layer. As the stress at a point within the conductive layer is proportional to the orthogonal distance of that point from the neutral plane, this design minimises the stress within the conductive layer by minimising the furthest distance between the surfaces of the layer and the neutral plane.

The strength of the resilient isolator described above can be further enhanced through a suitable choice of orientation within the pump. This is shown diagrammatically in FIG. 23. During operation the pressure in a first pump cavity 113*a* exceeds the pressure in a second pump cavity 113*b*, and the pressure difference between the two pump cavities generates a force on the actuator which deflects the actuator 200 from its rest position into the second pump cavity 113*b*. This deflection distorts the isolator 220 into an approximately sigmoid shape. The conductive layer 225 has two surfaces: a first surface 235*a*, which faces the first pump cavity 113*a*, and a second surface 235*b*, which faces the second pump cavity 113*b*. In this embodiment the first surface 235*a* is exposed to the first pump cavity 113*a*.

Consider first the interface region 240 between the isolator 220, comprising the conductive layer 225 and the support layer 228, and the actuator 200, comprising the piezoelectric layer 201 and the substrate layer 202 arranged around the central isolator 220. Because the neutral plane of the isolator 220 is within the conductive layer 225, the first surface of the conductive layer 235*a* experiences compressive stress and the second surface of the conductive layer 235*b* experiences tensile stress. Conversely, at the interface region 250 between the isolator 220 and the cavity walls 107*a* and 107*b* the first surface of the conductive layer 235*a* experiences tensile stress and the second surface of the conductive layer 235*b* experiences compressive stress.

For pneumatic failure of the isolator to occur, a crack propagates through the full thickness of the isolator. This process occurs far more readily at sites where the isolator material is in tension than in compression, as in compressed regions of the isolator any cracks are biased closed and no new material is exposed to the crack tip. Therefore, it is desirable to reinforce the isolator 220 described above on the second surface 235*b* in the interface region 240 between the isolator 220 and the actuator 200, and on the first surface 235*a* in the interface region 250 between the isolator 250 and the cavity walls 107*a* and 107*b*.

Figure 23:
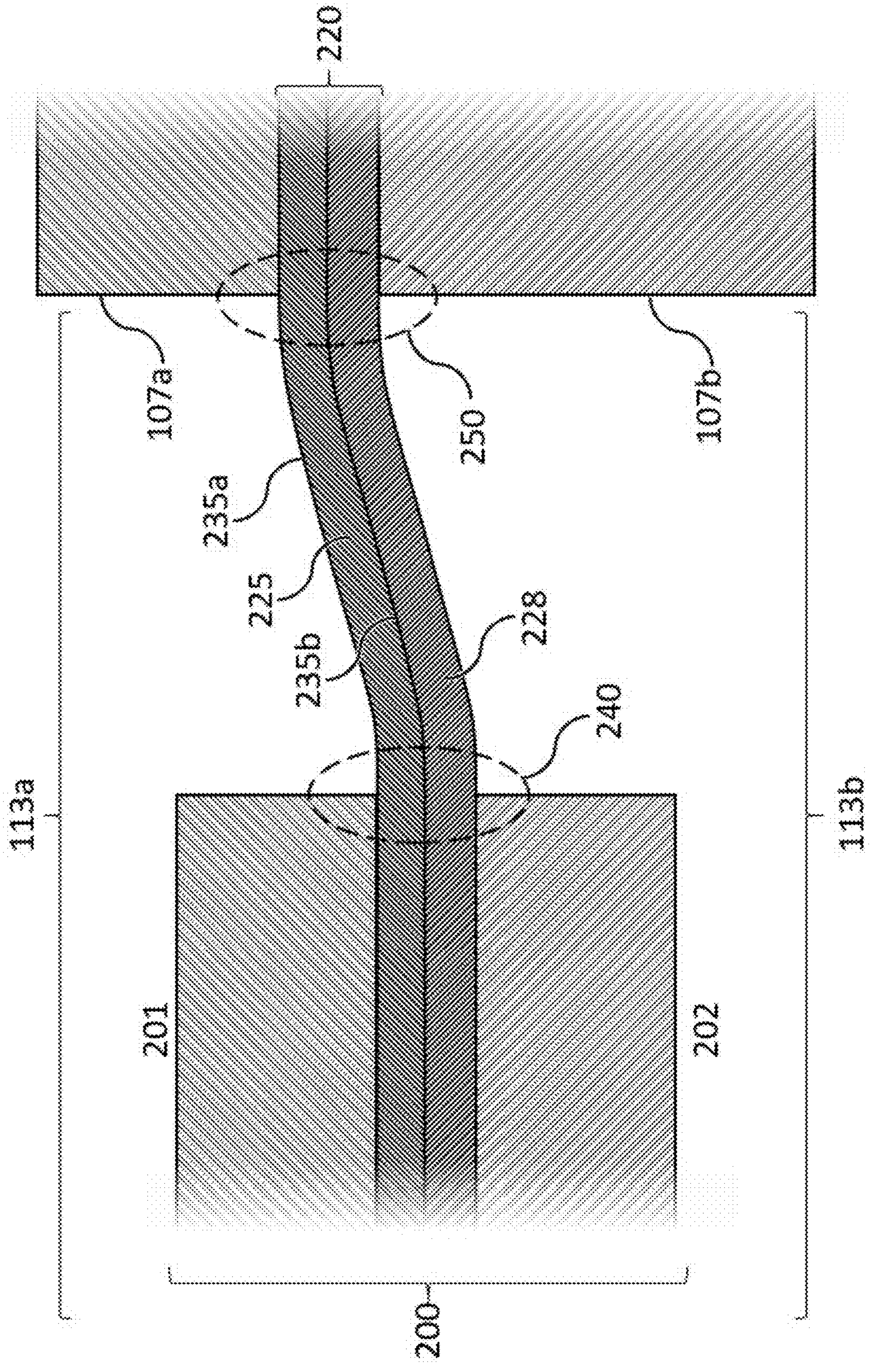
FIG. 23 shows an actuator assembly comprising a piezoelectric layer, a substrate layer, and a single layer isolator.
Figure 24:
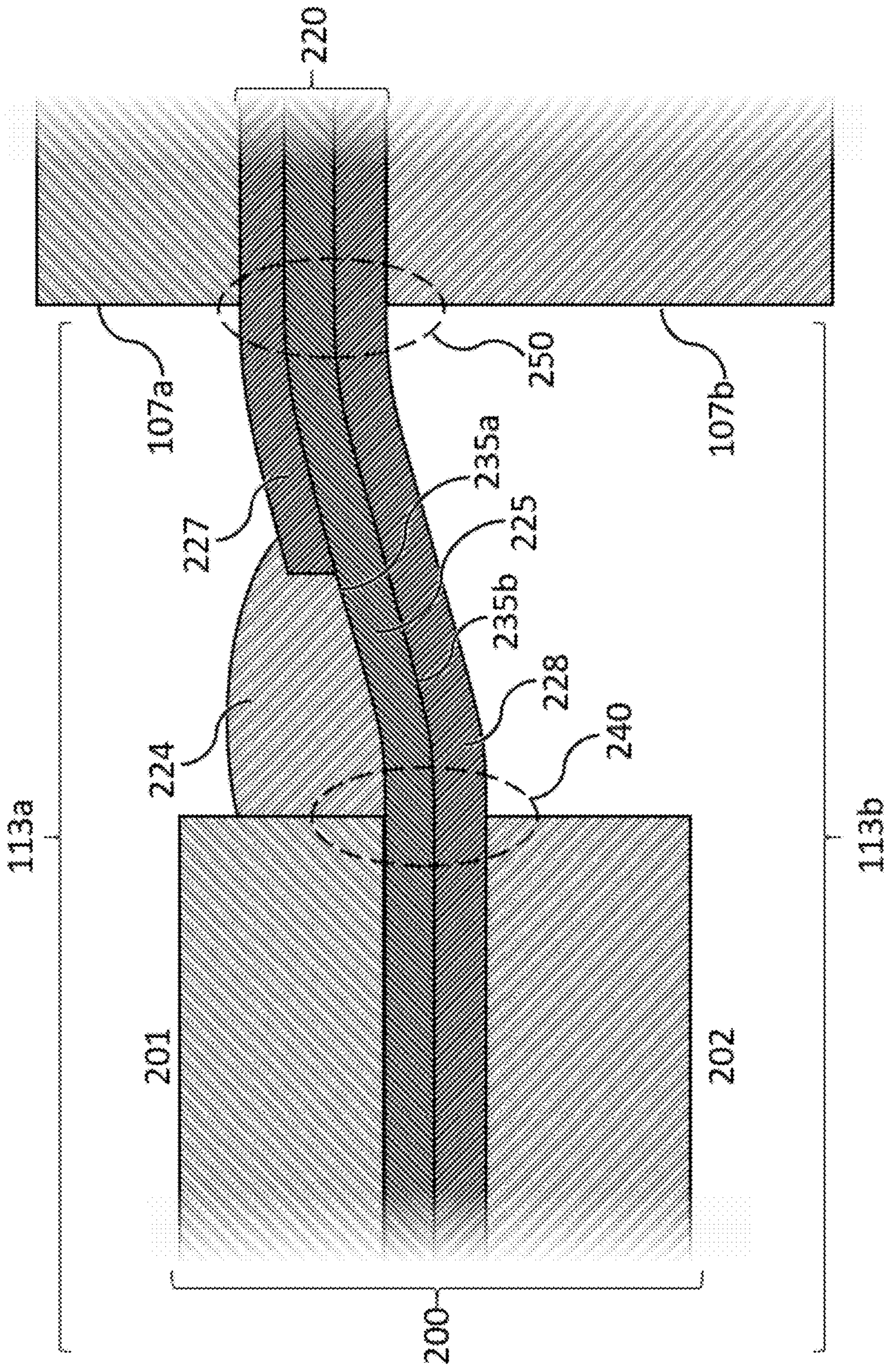
FIG. 24 shows a variant of the actuator assembly of FIG. 23 wherein the isolator includes an additional layer for reinforcement.

The second surface 235*b* may be reinforced in the interface region 240 between the isolator 220 and the actuator 200 by using the support layer 228 and orienting the actuator within the pump such that the support layer 228 is bonded to the second surface 235*b* as is shown in FIG. 23. This therefore imposes a preferred orientation of the actuator within the pump in order to maximise fatigue resistance. The first surface 235*a* may be reinforced in the interface region 250 between the isolator 220 and the cavity wall 107*a* by means of an additional layer, such as a fail-safe layer, rigidising layer, or similar. FIG. 24 shows the specific case where the additional layer is a protective layer 227. This isolator design, comprising a support layer, an electrically conductive layer, and a peripheral protective layer 227, oriented within the pump such that the second surface 235*b* of the electrically conductive layer 225 is bonded to the support layer 228, will be referred to herein as the "single layer isolator", or SLI.

The electrically conductive layer 225 may be formed from any conductive material, such as copper, beryllium copper, copper-nickel alloys, Inconel alloys, or aluminium, and may include electrically conductive coatings which further boost the conductivity of the layer without significantly contributing to the flexural rigidity of the isolator. It may also be formed of a stack of suitable electrically conductive materials to ensure that the flexural rigidity of the isolator is optimal. The support layer 228 may be formed of any suitable flexible material such as plastics, or a stack of suitable flexible materials to ensure that the flexural rigidity of the isolator is optimal.

FIG. 24 shows an actuator assembly 200 (comprising a piezoelectric layer 201, a substrate layer 202, and an SLI 220) which is further reinforced for the most demanding applications. The SLI 220 may be conveniently constructed using conventional manufacturing techniques, and then combined with a piezoelectric layer 201 and a substrate layer 202 to form the final actuator assembly 200. This process leaves an unprotected annulus of the conductive layer on the first surface, as for tolerancing reasons the protective layer 227 cannot interface directly with the piezoelectric layer 201 while still maintaining electrical contact between the electrically conductive layer 228 and the piezoelectric layer 201. This annulus may be covered with a further fail-safe layer 224 following actuator assembly to reduce or fully cover the unprotected region. This fail-safe 224 layer may be constructed of any material and be applied using any process. In a preferred embodiment, the fail-safe layer 224 is constructed from a layer of adhesive, of thickness between 1 micron and 1000 microns, where the adhesive is elastically compliant to accommodate any distortions to the isolator surface during operation without significantly damping the motion of the actuator. The adhesive is deposited in a pattern such that it forms a bond between the edge of the piezoelectric layer 201, the first surface of the electrically conductive layer 225, and the peripheral protective layer 227, therefore ensuring that the first surface 235*a* of the electrically conductive layer 225 is completely covered in either the fail-safe layer 224, or the protective layer 227, or both the fail-safe layer 224 and the protective layer 227.

As described in previous embodiments, the conductive layer 225 of the SLI may be patterned to form regions with greater or lesser resistance to out-of-plane bending.

In one embodiment, the patterning of the conductive layer defines three annular regions. The outer annular region is connected to the side wall, the inner annular region is connected to the actuator, and an intermediate annular region is positioned between the inner and outer annular regions. The patterning of the conductive layer is designed such that the intermediate annular region is less resistant than both the inner and the outer annular regions to out-of-plane bending under oscillation of the actuator in the axial direction. This design maintains the strength of the SLI at the interface between the isolator and the actuator and at the interface between the isolator and the pump body.

In a second embodiment, the patterning of the conductive layer defines two annular regions. The outer annular region is connected to the side wall and the inner annular region is connected to the actuator. The patterning of the conductive layer is designed such that the inner annular region is less resistant than the outer annular region to out-of-plane bending under oscillation of the actuator in the axial direction. This design maintains the strength of the SLI at the interface between the isolator and the pump body, where there may be stress raisers due to unwanted second adhesive fillets 223, while allowing the isolator to oscillate more freely than in the three-region design described above.

Figure 25A:
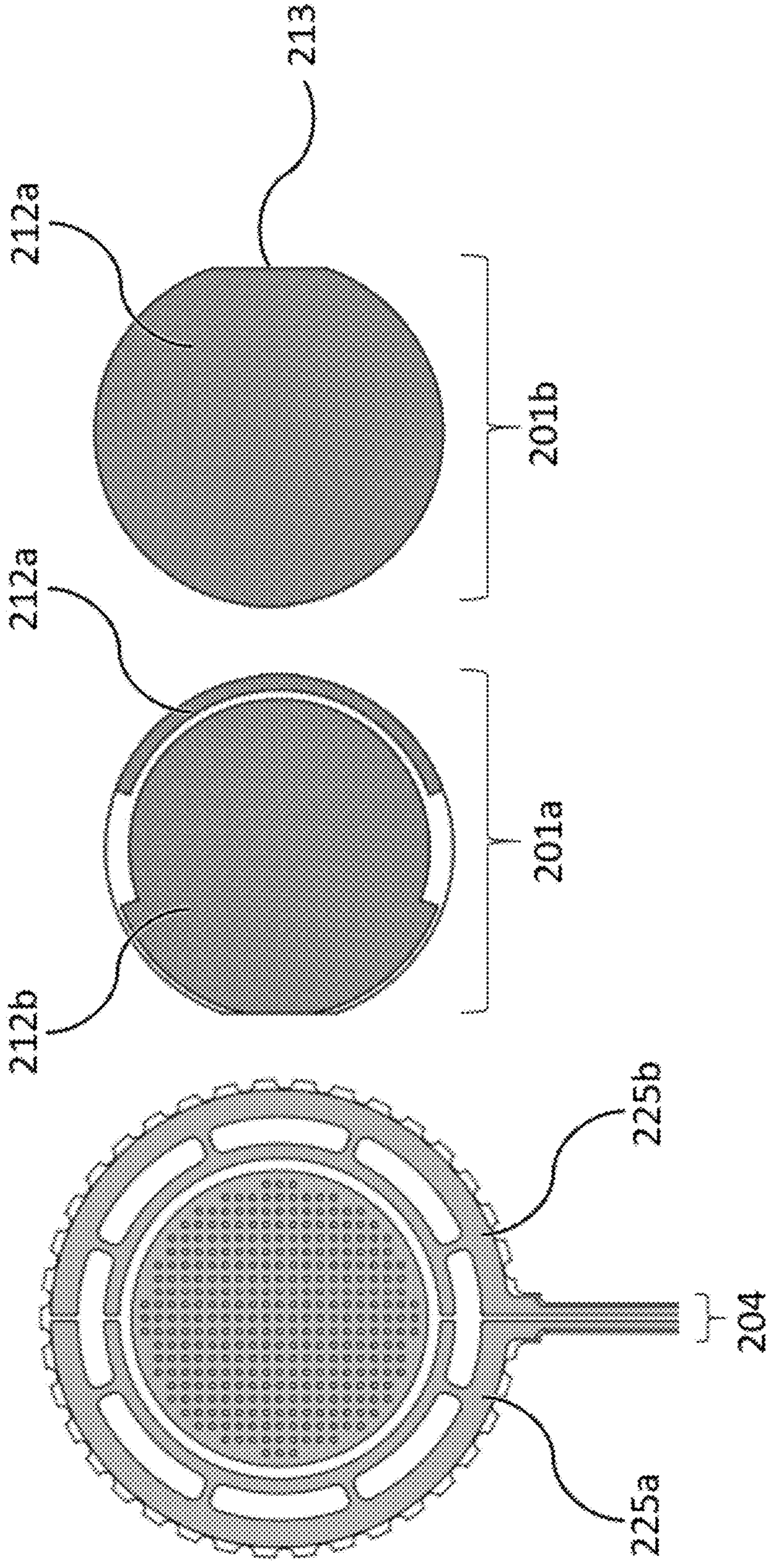
FIGS. 25*a* and 25*b* show an arrangement of the isolator and the actuator.
Figure 25B:
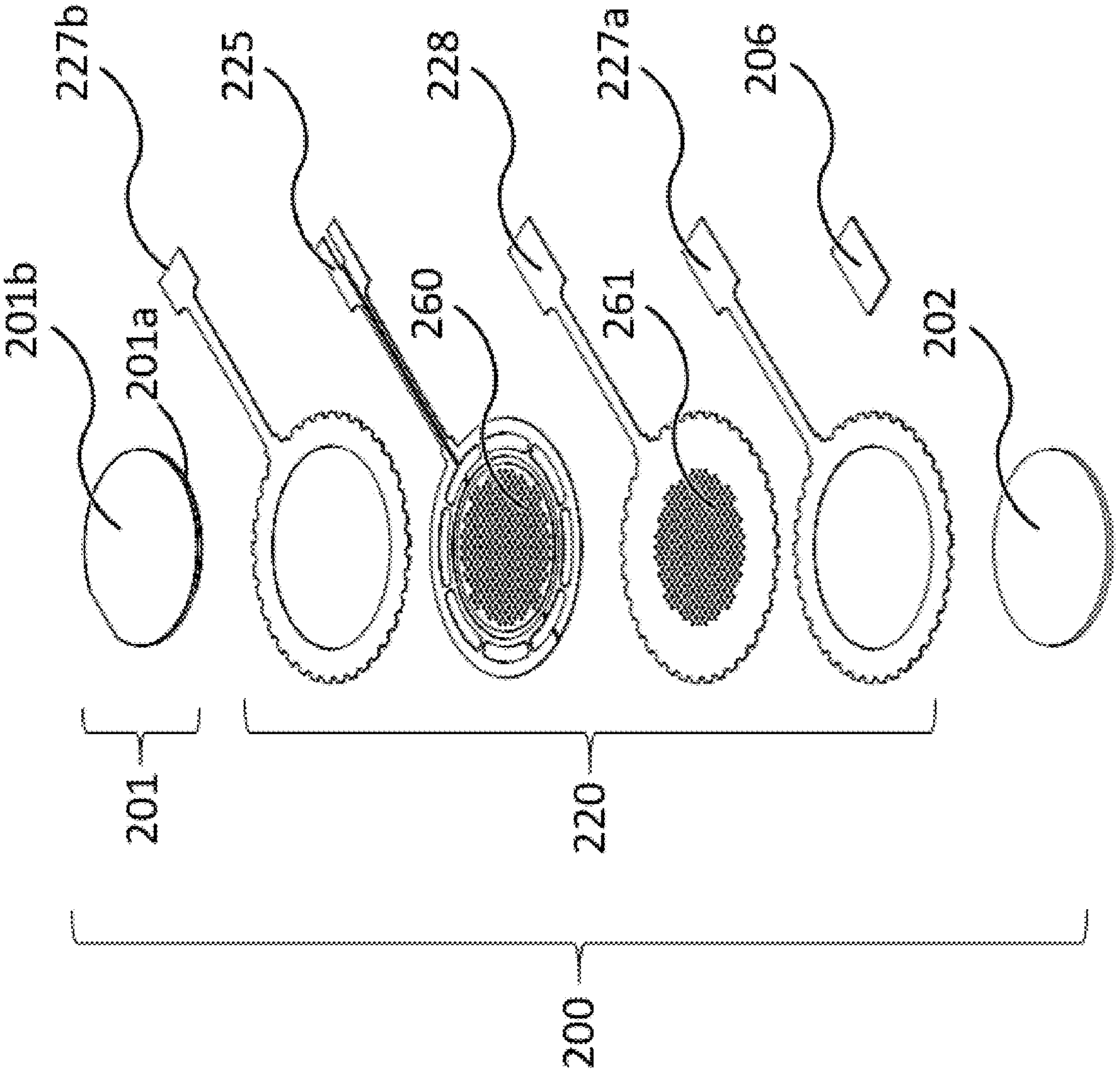

A preferred embodiment of the SLI design is shown in FIG. 25*a* and FIG. 25*b*, which may be used with or without a fail-safe layer 224 as described above. FIG. 25*a* shows a plan view of the electrically conductive layer and the support layer of the SLI, with the first surface of the electrically conductive layer 235*a* facing the viewer. The electrically conductive layer 235*a* comprises two regions—a first conductive region 225*a*, and a second conductive region 225*b*. The conductive layer 235*a* interfaces with the lower surface 201*a* of the piezoelectric disc 201, which has a first electrode region 212*a* and a second electrode region 212*b*. The first conductive region 225*a* interfaces with the first electrode region 212*a* of the piezoelectric disc, and the second conductive region 225*b* interfaces with the second electrode region 212*b* of the piezoelectric disc. This interfacing ensures that there is electrical continuity between the first conductive region 225*a* and the first electrode region 212*a*, and between the second conductive region 225*b* and the second electrode region 212*b*, whilst there is no electrical continuity between either the first conductive region 225*a* and the second electrode region 212*b*, nor between the second conductive region 225*b* and the first electrode region 212*a*.

To ensure the correct interfacing between the conductive regions and the electrode regions described above, careful control of the rotational alignment of the piezoelectric disc should be achieved during manufacture. The embodiment shown in FIG. 25 has a rotational alignment feature 213 or keying feature comprising a flat on the piezoelectric disc to ensure this interfacing is correct. Other rotational alignment features may be used instead, including graphical marking of the disc surface, fiducials marked directly onto the electrode regions of the disc, or shaping, stamping, or otherwise marking, altering, or forming the piezoelectric disc to indicate a preferred orientation.

The first electrode region 212*a* is wrapped around the edge of the piezoelectric disc in at least one location around its circumference to bring a portion of the first electrode region 212*a* onto the top surface of the piezoelectric disc 201*b*. In operation, a voltage is applied between the first conductive region 225*a* and the second conductive region 225*b*, and hence a voltage is also applied between the first electrode region 212*a* and the second electrode region 212*b*. It is desirable that the majority of the top surface 201*b* of the piezoelectric disc is covered with the first electrode region 212*a*, and that the majority of the lower surface 201*a* of the piezoelectric disc is covered with the second electrode region 212*b*, as this means that the voltage between the first electrode region 212*a* and the second electrode region 212*b* establishes an electric field between the electrodes in a substantially axial direction. The piezoelectric disc 201 is polarized such that the substantially axial electric field causes the piezoelectric disc to expand or contract in a substantially radial direction depending on the polarity of the electric field applied, and this expansion or contraction is in those regions of the piezoelectric disc where the axial electric field is applied. The radial motion of the piezoelectric disc 201 is resisted by the substrate layer 202, with the resulting shear causing the axial deformation of the actuator 200, which in turn drives pressure oscillations within the pump cavities. Therefore the electrode pattern described above (where the majority of the top surface 201*b* of the piezoelectric disc is covered with the first electrode region 212*a* and the majority of the lower surface 201*a* of the piezoelectric disc is covered with the second electrode region 212*b*) has the further benefit of producing a large motive force per unit volt to the actuator assembly, ensuring that the axial deformation of the actuator during operation is substantial and hence that the magnitude of the pressure oscillation within the pump cavities are also substantial.

For reasons described in previous embodiments, the conductive layer 225 of the isolator is patterned such that, after construction of the isolator 220, piezoelectric disc 201, and substrate disc 202 into the actuator subassembly 200, and after the construction of the actuator subassembly and other requisite components into a pump, two distinct annular regions of the isolator are formed. The outer annular region is connected to the side wall and the inner annular region is connected to the actuator. The patterning of the conductive layer is designed such that the inner annular region is less resistant than the outer annular region to out-of-plane bending under oscillation of the actuator in the axial direction. This patterning is achieved by the either complete or partial removal of the conductive layer at any stage, and using any method, during the manufacturing process or thereafter. The patterning shown in FIG. 25*a* takes the form of an azimuthally-repeating series of arcuate formations; other embodiments may make use of any of the other patterns described elsewhere in this document—for example, see FIG. 19*i-ii*. If a fail-safe layer 224 is used, it should be positioned over the inner annular region as described in FIG. 24.

FIG. 25*b* shows an exploded view of the actuator assembly 200 of the preferred embodiment, with each layer shown in isolation for clarity. The isolator subassembly 220 comprising a first protective layer 227*a*, a support layer 228, a conductive layer 225, and a second protective layer 227*b* which are bonded together using any method, including using adhesives or through adhesiveless processes. The first protective layer 227*a* provides additional protection to the support layer 228 from second adhesive fillets 223*b* during manufacture (see FIG. 18).

The conductive layer 225 may be formed of any electrically conductive material including copper, copper-nickel alloy, beryllium-copper alloy, gold, aluminium, steel, or inconel alloy, or from any laminar stack of materials where at least one layer of the stack is electrically conductive. The support layer 228 may be formed of any gas-impermeable flexible material including polyimide or acrylic plastic. The protective layers 227*a* and 227*b* may be formed of any material, including polyimide, acrylic, or steel. The conductive layer 225, support layer 228, and protective layers 227*a* and 227*b* may be of any thickness, preferably between 5 and 1000 microns, more preferably between 10 and 50 microns. The conductive layer 225*a* is bonded to the piezoelectric disc 201 as described above (e.g., to the lower surface of the piezoelectric disc, 201*a*), and the support layer 228 is bonded to the substrate disc 202. A matrix of through-holes in the conductive layer 260 and in the support layer 261 allow a direct adhesive bond to form between the piezoelectric disc 201 and the substrate disc 202, ensuring good adhesion of the actuator assembly.

Electrical contact to the external drive circuit is ensured using the isolator tail 204, which extends through the full thickness of the pump following assembly as shown in FIG. 6 and FIG. 25*a*. The point of electrical contact with the external circuit is reinforced with a rigidiser 206, which may be made of any durable material with greater rigidity than the isolator circuit, to increase product durability.

It will be understood that the invention has been described in relation to its preferred embodiments and may be modified in many different ways without departing from the scope of the invention as defined by the accompanying claims.

What is claimed is:

1. A pump for a microfluidic device, comprising:

a lower pump body and an upper pump body comprising respective end walls connected to a peripheral side wall;

an actuator located between the lower pump body and the upper pump body and connected to the side wall by a resilient isolator so as to define two substantially cylindrical cavities for containing a fluid, the actuator being configured to oscillate in an axial direction so as to produce a spatially varying pressure wave in the two cavities;

first and second valves arranged to control flow of the fluid in a first of the two cavities, each first and second valve located on a same side of the actuator, and each first and second valve located at a pressure antinode of the pressure wave;

third and fourth valves arranged to control flow of the fluid in a second of the two cavities, each valve located on a same side of the actuator opposite that of the first and second valves, and each third and fourth valve located at a pressure antinode of the pressure wave; and a manifold flow that forms a pneumatic connection between the first and second cavities between the second valve of the first cavity and the third valve of the second cavity;

wherein:

the manifold comprises a U-shaped channel formed in the lower and upper pump bodies, the U-shaped channel having open-ended first and second radial bores, and an intersecting perpendicular axial bore fluidly disposed between the first and second radial bores, the open-ended first and second radial bores each being sealed at their respective open-end by a close-fitting sphere;

the resilient isolator is a planar, layered structure comprising a conductive layer and a support layer and is susceptible to out-of-plane bending under the oscillation of the actuator in the axial direction; and a first surface of the conductive layer is arranged on the support layer so as to strengthen a portion of the first surface against tensile stress imposed on the first surface by said bending.

2. The pump according to claim 1, wherein said portion of the first surface is located at an interface region between the resilient isolator and the actuator.

3. The pump according to claim 1, wherein the conductive layer comprises a second surface which is opposite the first surface thereof, the second surface being exposed to one of the two substantially cylindrical cavities.

4. The pump according to claim 1, wherein the conductive layer comprises a second surface which is opposite the first surface thereof and a reinforcement layer is arranged on the second surface so as to strengthen a portion of the second surface against tensile stress imposed on the second surface by said bending.

5. The pump according to claim 4, wherein said portion of the second surface is located at an interface region between the resilient isolator and the peripheral side wall.

6. The pump according to claim 5, wherein the resilient isolator comprises a protective layer disposed on the second surface of the conductive layer between the reinforcement layer and the actuator.

7. The pump according to claim 6, wherein the reinforcement layer and the protective layer together substantially fully cover the second surface of the conductive layer.

8. A pump for a microfluidic device, comprising:

a lower pump body and an upper pump body comprising respective end walls connected to a peripheral side wall;

an actuator located between the lower pump body and the upper pump body and connected to the side wall by a resilient isolator so as to define two substantially cylindrical cavities for containing a fluid, the actuator being configured to oscillate in an axial direction so as to produce first and second spatially varying pressure waves in the respective two cavities;

first and second valves arranged to control flow of the fluid in a first of the two cavities, each first and second valve located on a same side of the actuator, and each first and second valve located at a pressure antinode of the pressure wave;

third and fourth valves arranged to control flow of the fluid in a second of the two cavities, each valve located on a same side of the actuator opposite that of the first and second valves, and each third and fourth valve located at a pressure antinode of the pressure wave; and a manifold flow that forms a pneumatic connection between the first and second cavities between the second valve of the first cavity and the third valve of the second cavity;

wherein the manifold comprises a U-shaped channel formed in the lower and upper pump bodies, the U-shaped channel having open-ended first and second radial bores, and an intersecting perpendicular axial bore fluidly disposed between the first and second radial bores, the open-ended first and second radial bores each being sealed at their respective open-end by a close-fitting sphere;

wherein the resilient isolator is a planar, layered structure comprising a plurality of annular regions between the side wall and the actuator, layers of the resilient isolator being configured such that at least one of the plurality of annular regions is less resistant than another one of the plurality of annular regions to out-of-plane bending under the oscillation of the actuator in the axial direction.

9. The pump according to claim 8, wherein the resilient isolator comprises an outer annular region connected to the side wall and an inner annular region connected to the actuator, the layers of the resilient isolator being configured such that one of the outer annular region and the inner annular region is less resistant than the other of the outer annular region and the inner annular region to said out-of-plane bending under the oscillation of the actuator in the axial direction.

10. The pump according to claim 9, wherein the layers of the resilient isolator are configured such that the inner annular region is less resistant than the outer annular region to said out-of-plane bending under the oscillation of the actuator in the axial direction.

11. The pump according to claim 9, wherein the layers of the resilient isolator are configured such that the outer annular region is less resistant than the inner annular region to said out-of-plane bending under the oscillation of the actuator in the axial direction.

12. The pump according to claim 8, wherein the resilient isolator comprises an outer annular region connected to the side wall, an inner annular region connected to the actuator, and an intermediate annular region between the inner and outer annular regions, the layers of the resilient isolator being configured such that the intermediate annular region is less resistant than the inner and outer annular regions to said out-of-plane bending under the oscillation of the actuator in the axial direction.

13. The pump according to claim 12, wherein the layers of the resilient isolator are configured such that the inner annular region and the outer annular region have substantially the same resistance to said out-of-plane bending under the oscillation of the actuator in the axial direction.

14. The pump according to claim 12, wherein the layers of the resilient isolator are configured such that the inner annular region is less resistant than the outer annular region to said out-of-plane bending under the oscillation of the actuator in the axial direction.

15. The pump according to claim 12, wherein the layers of the resilient isolator are configured such that the outer annular region is less resistant than the inner annular region to said out-of-plane bending under the oscillation of the actuator in the axial direction.

16. The pump according to claim 8, wherein the resilient isolator comprises an electrical isolation layer located between a first electrical conduction layer and a second electrical conduction layer.

17. The pump according to claim 16, wherein the resilient isolator comprises a protective layer located on the first electrical conduction layer.

18. The pump according to claim 8, wherein the resilient isolator comprises a fluid barrier layer configured to prevent the fluid from escaping from the two cavities.

19. The pump according to claim 18, wherein one or both of an annular region of the resilient isolator, which is less resistant to said out-of-plane bending, and another annular region, which is more resistant to said out-of-plane bending, comprises the fluid barrier layer.

20. The pump according to claim 8, wherein a first annular region of the resilient isolator, which is less resistant than a second annular region to said out-of-plane bending, comprises a patterned layer, such that at least a portion of the first annular region has a thickness in the axial direction which is less than the thickness of the second annular region in the axial direction.

21. The pump according to claim 20, wherein the patterned layer comprises a pattern including circular sections.

22. The pump according to claim 20, wherein the patterned layer comprises a pattern including arcs.

23. The pump according to claim 20, wherein the patterned layer comprises a pattern including regular or irregular polygons.

24. The pump according to claim 23, wherein the regular or irregular polygons, diamonds, squares or other rectangles, include rounded corners.

25. The pump according to claim 20, wherein the patterned layer comprises a pattern including diamonds, squares or other rectangles.

26. The pump according to claim 20, wherein the pattern is regular or repeated with respect to one or more of the radial direction, the azimuthal direction, and the axial direction.

27. The pump according to claim 20, wherein the pattern comprises through-holes provided in the patterned layer.

28. The pump according to claim 20, wherein the patterned layer is formed by removal of material from the first annular region of the resilient isolator.

29. The pump according to claim 8, wherein at least two of the layers of the resilient isolator are joined together by an adhesive.

30. The pump according to claim 8, wherein an annular region of the resilient isolator, which is less resistant to said out-of-plane bending, has a greater radial width than another annular region, which is more resistant to said out-of-plane bending.

31. The pump according to claim 8, wherein the second spatially varying pressure wave in the second cavity is approximately 180 degrees out of phase with the first spatially varying pressure wave in the first cavity, the pump further comprising third and fourth valves arranged to control flow of the fluid in the second cavity and each located at a pressure antinode of the second pressure wave.

32. An actuator for the pump according to claim 8, the actuator comprising a piezoelectric disc including a surface which comprises:

a first electrode region for electrical connection with a first conductive region of the conductive layer of the resilient isolator; and a second electrode region for electrical connection with a second conductive region of the conductive layer of the resilient isolator, wherein:

the first and second electrode regions are distinct from each other and the first and second conductive regions are distinct from each other, such as to provide electrical continuity between the first electrode and the first conductive region and between the second electrode and the second conductive region while providing electrical isolation between the first electrode and the second conductive region and between the second electrode and the first conductive region; and the piezoelectric disc comprises an alignment feature for rotational alignment of the piezoelectric disc to ensure the electrical connection between the first electrode region and the first conductive region and between the second electrode region and the second conductive region.

33. The actuator for the pump according to claim 32, wherein the alignment feature comprises a straight edge of the piezoelectric disc for locating engagement with a complementary edge of the resilient isolator or the pump body.

* * * * *